(12) United States Patent
Wakabayashi

(10) Patent No.: US 7,773,986 B2
(45) Date of Patent: Aug. 10, 2010

(54) MOBILE COMMUNICATION METHOD

(75) Inventor: Hideji Wakabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/652,439

(22) Filed: Jan. 5, 2010

(65) Prior Publication Data

US 2010/0105387 A1    Apr. 29, 2010

Related U.S. Application Data

(62) Division of application No. 10/582,955, filed as application No. PCT/JP2004/004502 on Mar. 30, 2004, now Pat. No. 7,680,496.

(51) Int. Cl.
H04W 4/00    (2009.01)
(52) U.S. Cl. .................. 455/434; 455/572; 455/435; 455/436
(58) Field of Classification Search ......... 455/434–436, 455/572
See application file for complete search history.

(56) References Cited

U.S. PATENT DOCUMENTS

| | | | |
|---|---|---|---|
| 5,481,258 A | | 1/1996 | Fawcett et al. |
| 6,594,501 B2 * | | 7/2003 | Black et al. ............... 455/522 |
| 6,628,631 B1 | | 9/2003 | Mazawa et al. |
| 6,760,587 B2 * | | 7/2004 | Holtzman et al. ........... 455/436 |
| 7,415,277 B2 * | | 8/2008 | Okuyama ................. 455/436 |
| 2003/0083069 A1 * | | 5/2003 | Vadgama .................. 455/436 |
| 2003/0088695 A1 * | | 5/2003 | Kwak et al. ............... 709/238 |
| 2003/0119452 A1 * | | 6/2003 | Kim et al. ................. 455/69 |
| 2003/0232622 A1 * | | 12/2003 | Seo et al. ................. 455/437 |
| 2004/0087320 A1 * | | 5/2004 | Kim et al. ................. 455/458 |
| 2004/0229572 A1 * | | 11/2004 | Cai et al. ................. 455/69 |

FOREIGN PATENT DOCUMENTS

| | | |
|---|---|---|
| CN | 1426184 A | 6/2003 |
| CN | 1476198 A | 2/2004 |
| CN | 101051866 A | 10/2007 |
| EP | 1 359 782 A1 | 11/2003 |
| EP | 1 372 350 A1 | 12/2003 |
| EP | 1 401 152 A2 | 3/2004 |
| GB | 2 389 488 A | 12/2003 |
| JP | 8-172390 | 7/1996 |
| JP | 8-186857 | 7/1996 |

(Continued)

OTHER PUBLICATIONS

Krischan, 3RD Generation Partnership Project TR 25.925; V3.4.0, pp. 1-31, 2001.

(Continued)

*Primary Examiner*—Rafael Pérez-Gutiérrez
*Assistant Examiner*—Issam Chakour
(74) *Attorney, Agent, or Firm*—Oblon, Spivak, McClelland, Maier & Neustadt, L.L.P.

(57) ABSTRACT

A mobile communications terminal divides a plurality of multipath signals associated with radio signals transmitted from a plurality of base stations using an S-CCPCH into groups by base station, i.e., by transmit source, maximum-ratio-combines a plurality of multipath signals associated with each same base station which is a transmit source into a composite signal, decodes the composite signal, and selects a composite signal having a good decoded result from among decoded composite signals.

1 Claim, 16 Drawing Sheets

FOREIGN PATENT DOCUMENTS

| | | |
|---|---|---|
| JP | 10-336144 | 12/1998 |
| JP | 11-308657 | 11/1999 |
| JP | 2000-101596 | 4/2000 |
| JP | 2000-165938 | 6/2000 |
| JP | 2000-217139 | 8/2000 |
| JP | 2002-335557 | 11/2002 |
| JP | 2003-134550 | 5/2003 |
| JP | 2003-188818 | 7/2003 |
| JP | 2004-23668 | 1/2004 |
| RU | 2 157 598 C2 | 10/2000 |
| WO | WO 02/32184 A2 | 4/2002 |
| WO | WO 03/071797 | 8/2003 |
| WO | WO 03/096149 | 11/2003 |

OTHER PUBLICATIONS

"Selective Combining for MBMS", TSG-RAN Working Group 1, NTT Docomo, No. 32, pp. 1-8, 2003.

* cited by examiner

MOBILE COMMUNICATION METHOD

CROSS REFERENCE TO RELATED APPLICATIONS

This application is a divisional application of U.S. Ser. No. 10/582,955 filed Jun. 15, 2006, which is the National Stage of International Application No. PCT/JP04/04502 filed Mar. 30, 2004. The entire content of U.S. Ser. No. 10/582,955 is incorporated herein by reference.

FIELD OF THE INVENTION

The present invention relates to a mobile communications terminal and a radio communications system which, when receiving multimedia data transmitted from a base station using a CDMA (Code Division Multiple Access) method, can improve the reception quality of the multimedia data.

BACKGROUND OF THE INVENTION

Related art radio communications systems are based on the premise that there is a one-to-one correspondence between base stations and mobile communications terminals (e.g., mobile phones and mobile PCs), and therefore do not support services of transmitting data to two or more mobile communications terminals simultaneously using a base station. There is a previously known method of notifying broadcast information from a base station to all mobile communications terminals in the control area of the base station all at once using a common channel. However, this method is aimed at notifying information about control to all mobile communications terminals in the control area all at once, but is not aimed at transmitting data, such as audio data and image data, to all mobile communications terminals in the control area all at once.

In recent years, expectations have been running high for the use of multimedia services as mobile communications services. Particularly, the spotlight has been turned on a technology of simultaneously delivering multimedia data about sports live broadcasting, weather report, and radio, etc. to two or more mobile communications terminals.

There has been proposed a technology of, in addition to a first common channel (P-CCPCH: Primary-Common Control Physical Channel) which a base station uses when notifying broadcast information to two or more mobile communications terminals, providing a second common channel (S-CCPCH: Secondary-Common Control Physical Channel) which the base station uses when delivering signaling or multimedia data to two or more mobile communications terminals, and delivering multimedia data from the base station to two or more mobile communications terminals using the S-CCPCH (see patent reference 1 and nonpatent reference 1).

By thus delivering multimedia data using an S-CCPCH, a base station can simultaneously provide multimedia data to two or more mobile communications terminals. However, when a mobile communications terminal is located in the vicinity of the periphery of the control area of the base station, the electric wave transmitted from the base station may become weak and hence the reception quality of the electric wave may degrade even if the mobile communications terminal is staying in the control area of the base station.

To solve this problem, the base station has a function of controlling its transmission power so that the mobile communications terminal which has the smallest reception power in all the mobile communications terminals which are staying in the control area thereof will have reception power exceeding reference power.

On the other hand, each mobile communications terminal has a function of, when receiving the same multimedia data from two or more base stations, improving the reception quality by maximum-ratio-combining the two or more multimedia data.

However, since the propagation paths of two or more multimedia data from two or more base stations to each mobile communications terminal differ from one another, the receipt times when each mobile communications terminal receives the two or more multimedia data transmitted from the two or more base stations differ from one another, and therefore each mobile communications terminal cannot carry out maximum ratio combining of the two or more multimedia data if the receipt time difference becomes beyond a predetermined time period.

[Patent reference 1] JP,2003-188818,A

[Nonpatent reference 1] 3GPP Standardization Document R1-031103 Selective Combining for MBMS A problem with related art radio communications systems constructed as mentioned above is that while a base station can secure the reception quality of each mobile communications terminal staying in the control area thereof by controlling its transmission power so that the mobile communications terminal which has the smallest reception power in all the mobile communications terminals which are staying in the control area thereof will have reception power exceeding reference power, an increasing of the transmission power assigned to the S-CCPCH may degrade the reception quality of information transmitted to a mobile communications terminal using another channel since the transmission power assigned to the other channel becomes low relatively.

Another problem is that while if each mobile communications terminal maximum-ratio-combines the same multimedia data transmitted from two or more base stations, each mobile communications terminal can improve the reception quality of the multimedia data without each base station controlling its transmission power, since the propagation paths of two or more multimedia data from the two or more base stations to each mobile communications terminal differ from one another, the receipt times when each mobile communications terminal receives the two or more multimedia data transmitted from the two or more base stations differ from one another, and therefore each mobile communications terminal cannot carry out maximum ratio combining of the two or more multimedia data if the receipt time difference becomes beyond a predetermined time period.

The present invention is made in order to solve the above-mentioned problems, and it is therefore an object of the present invention to provide a mobile communications terminal and a radio communications system which can improve the reception quality of multimedia data without controlling the power required for transmission of the multimedia data by means of a base station.

DISCLOSURE OF THE INVENTION

In accordance with the present invention, there is provided a mobile communications terminal including: a maximum-ratio-combining means for dividing a plurality of multipath signals associated with radio signals transmitted from a plurality of base stations using a common channel into groups by base station, i.e., by transmit source, and for maximum-ratio-combining a plurality of multipath signals associated with each same base station which is a transmit source into a composite signal; and a decoding means for decoding the composite signal outputted from the maximum-ratio-combining means, the mobile communications terminal selecting a composite signal having a good decoded result from among composite signals decoded by the decoding means.

In accordance with the present invention, there is also provided a communications method relating to a multimedia broadcast multicast service (MBMS) of multicasting or broadcasting a multimedia data to a plurality of mobile stations in a communications system, the communications method comprising: a communications method relating to a multimedia broadcast multicast service (MBMS) of multicasting or broadcasting a multimedia data to a plurality of mobile stations in a communications system, said communications method comprising: a power ratio transmitting step of transmitting information about a power ratio between a power of a common control physical channel used for multicasting or broadcasting said multimedia data in each of given cells and a power of a common pilot channel used for transmitting an information on reference of timing in each of the given cells; a service information transmitting step of transmitting service information indicating a state of an MBMS service in each of the given cells; a power ratio information receiving step of receiving the information about the power ratio transmitted in said power ratio transmitting step; a service information receiving step of receiving the service information transmitted in said service information transmitting step; a cell selecting step of acquiring a set including a plurality of cells from which a mobile station can receive an MBMS on the basis of the information about said power ratio which is received in said power ratio receiving step, and said service information received in said service information receiving step; a decoding step of receiving a signal transmitted using said common control physical channel in each of the plurality of cells included in the set acquired in said cell selecting step, and decoding said signal to acquire a plurality of decoded signals; and a selectively-combining step of selecting a signal from the plurality of decoded signals acquired in said decoding step and thereby obtaining an output signal.

Therefore, the present invention offers an advantage of being able to improve the reception quality of the radio signals without each base station controlling its transmission power.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
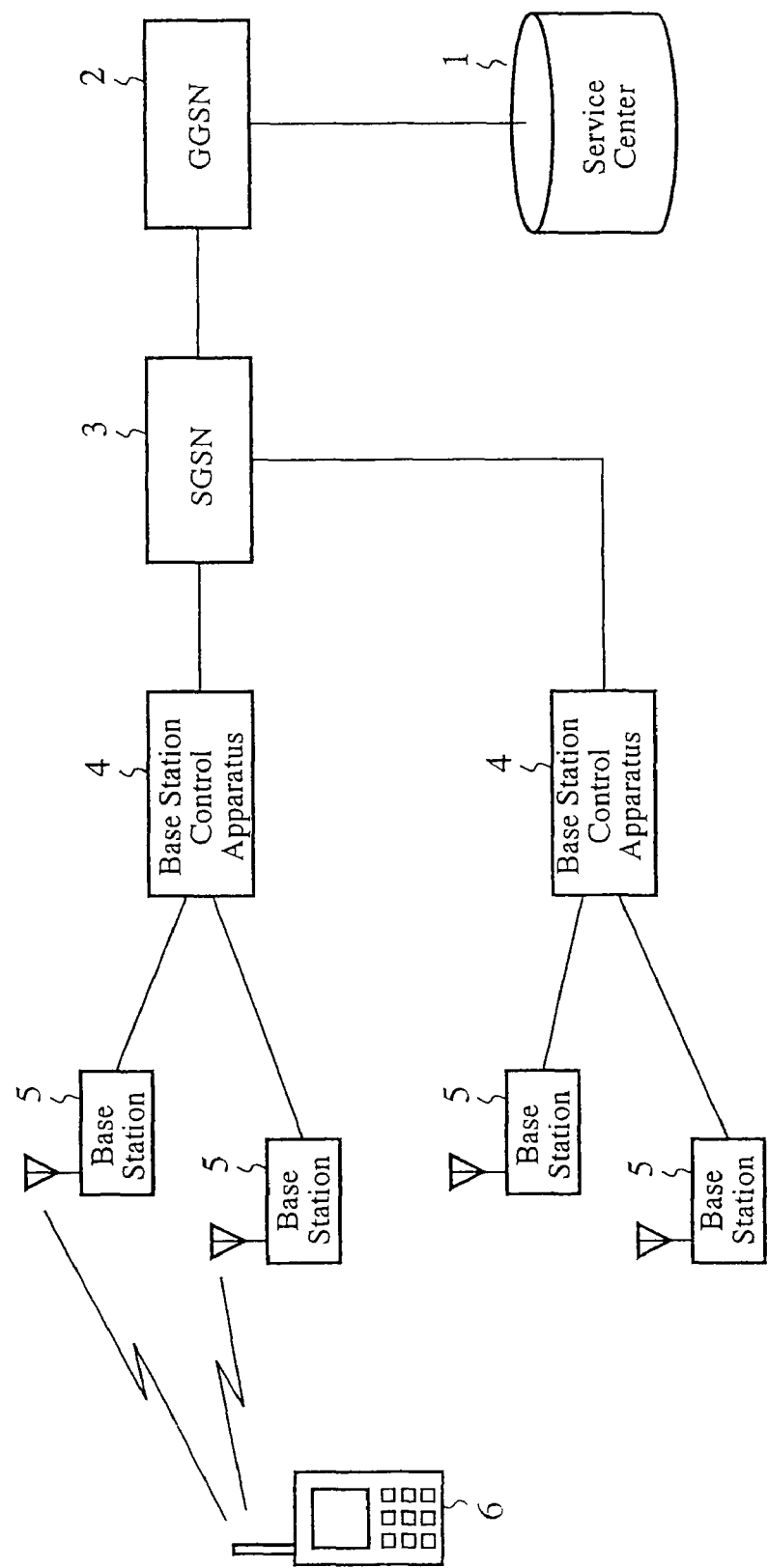
FIG. 1 is a block diagram showing a radio communications system in accordance with embodiment 1 of the present invention.

FIG. 1 is a block diagram showing a radio communications system in accordance with embodiment 1 of the present invention, and, in the figure, a service center 1 stores contents for delivery and delivers the contents. A GGSN (Gateway GPRS Support Node) 2 is a gate with an external network (e.g., the Internet network) which serves as a gateway with the outside of the radio communications system, and secures a path (path) via which packets are passed. The GGSN also carries out processes including collection of accounting information, mobility management, QoS (Quality of Service) negotiation, and policy control for adjusting traffic. An SGSN (Service GPRS Support Node) 3 takes charge of packet communications, and deals with authentication about each user, service subscription, routing, management of mobility, service restrictions, context storage, accounting information, etc.

Each base station control apparatus 4 is connected to the SGSN 3, and has a function of relaying between the core network and radio channels with base stations 5. Each base station control apparatus 4 mainly manages radio resources, and provides an instruction for establishing or releasing a channel with a base station 5. Each base station 5 delivers a radio signal (e.g., multimedia data or a pilot signal) to a mobile communications terminal 6 staying in a control area under the control thereof using, for example, an S-CCPCH (or a common channel) according to an instruction from a base station control apparatus 4.

Each mobile communications terminal 6 has a function of, when receiving multipath signals associated with radio signals transmitted from a plurality of base stations 5 using an S-CCPCH, dividing the multipath signals into groups by base station 5, i.e., by transmit source, maximum-ratio-combining a plurality of multipath signals which are grouped into each same base station 5, i.e., each same transmit source into a composite signal, decoding the composite signal, and selecting a decoded composite signal having a good decoded result from decoded composite signals.

Figure 2:
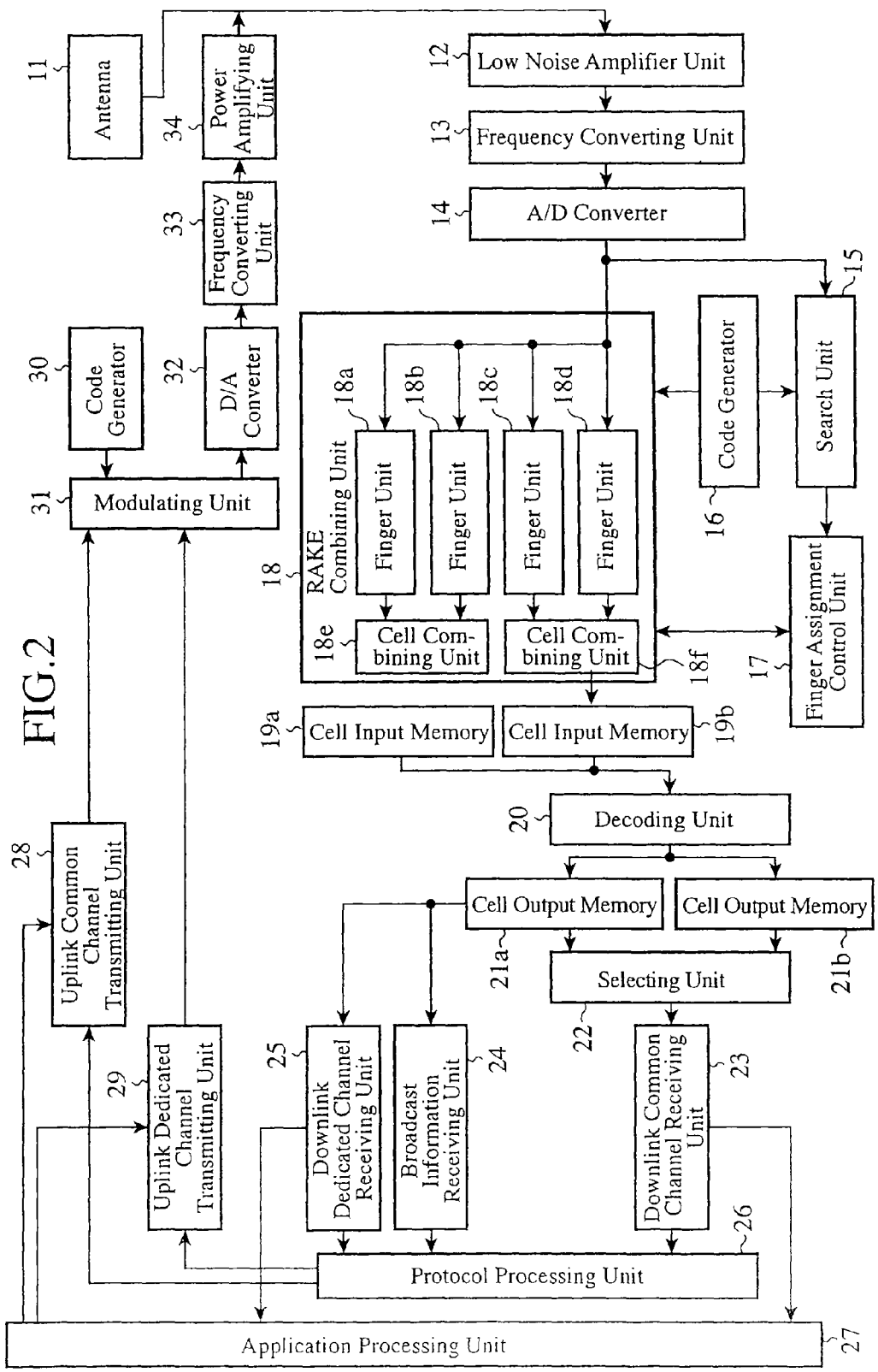
FIG. 2 is a block diagram showing a mobile communications terminal in accordance with embodiment 1 of the present invention.

FIG. 2 is a block diagram showing each mobile communications terminal in accordance with embodiment 1 of the present invention. In the figure, a low noise amplifier unit 12 amplifies a multipath signal which is a weak radio signal received by an antenna 11. A frequency converting unit 13 converts the frequency of the multipath signal amplified by the low noise amplifier unit 12 to output an RF (Radio Frequency) signal. An A/D converter 14 converts the RF signal outputted from the frequency converting unit 13, which is an analog signal, into a digital signal. A signal receiving means includes the antenna 11, low noise amplifier unit 12, frequency converting unit 13, and A/D converter 14.

When receiving an RF signal which is the digital signal from the A/D converter 14, a search unit 15 detects a base station 5 which is the transmit source of the multipath signal by carrying out cell search processing. A code generator 16 generates a scrambling code corresponding to the base station 5 detected by the search unit 15.

When base stations A and B which are included in the plurality of base stations 5 are set to be base stations 5 to be monitored (referred to as an active set from here on), a finger assignment control unit 17 controls an RAKE combining unit 18 so that an RF signal (referred to as an RF signal A-1 from there on) associated with a first multipath signal transmitted from the base station A is assigned to a finger unit 18a, an RF signal (referred to as an RF signal A-2 from here on) associated with a second multipath signal transmitted from the base station A is assigned to a finger unit 18b, an RF signal (referred to as an RF signal B-1 from here on) associated with a first multipath signal transmitted from the base station B is assigned to a finger unit 18c, and an RF signal (referred to as an RF signal B-2 from here on) associated with a second multipath signal transmitted from the base station B is assigned to a finger unit 18d.

A cell combining unit 18e of the RAKE combining unit 18 maximum-ratio-combines the RF signal A-1 assigned to the finger unit 18a and the RF signal A-2 assigned to the finger unit 18b into a composite signal, and stores the composite signal in a cell input memory 19a. A cell combining unit 18f maximum-ratio-combines the RF signal B-1 assigned to the finger unit 18c and the RF signal B-2 assigned to finger unit 18d into a composite signal, and stores the composite signal in a cell input memory 19b.

A maximum-ratio-combining means includes the search unit 15, code generator 16, finger assignment control unit 17, RAKE combining unit 18, and cell input memories 19a and 19b.

A decoding unit 20 decodes the composite signal stored in the cell input memory 19a and stores the decoded composite signal in a cell output memory 21a, and also decodes the composite signal stored in the cell input memory 19b and stores the decoded composite signal in a cell output memory 21b. A decoding means includes the decoding unit 20 and cell output memories 21a and 21b.

A selecting unit 22 selects a composite signal having a good decoded result from the decoded composite signals stored in the cell output memories 21a and 21b, and outputs the selected composite signal to a downlink common channel receiving unit 23. The selecting unit 23 constitutes a selecting means.

The downlink common channel receiving unit 23 outputs the selected composite signal outputted from the selecting unit 22 to a protocol processing unit 26 when the composite signal is control information, whereas it outputs the composite signal to an application processing unit 27 when the composite signal is application data. Since the selecting unit 22 does not carry out the process of selecting a composite signal when the decoded composite signal stored in the cell output memory 21a is broadcast information, a broadcast information receiving unit 24 receives the composite signal stored in the cell output memory 21a and outputs it to the protocol processing unit 26.

Since the selecting unit 22 does not carry out the process of selecting a composite signal when the decoded composite signal stored in the cell output memory 21a is application data or control information and has been transmitted to the mobile communications terminal by a base station 5 using a downlink dedicated channel, a downlink dedicated channel receiving unit 25 receives the composite signal stored in the cell output memory 21a and outputs the composite signal to the application processing unit 27 when the composite signal is application data, whereas it outputs the composite signal to the protocol processing unit 26 when the composite signal is control information.

The protocol processing unit 26 carries out processes about communications control, such as establishment or release of a channel, or handover, according to the composite signal (control information or broadcast information) outputted from the downlink common channel receiving unit 23, broadcast information receiving unit 24, or downlink dedicated channel receiving unit 25.

The application processing unit 27 carries out transform processes, such as voice codec and image codec according to the composite signal (application data) outputted from the downlink common channel receiving unit 23 or downlink dedicated channel receiving unit 25, and also carries out processes associated with man machine interfaces, such as a key input and a screen display.

An uplink common channel transmitting unit 28 carries out common channel processes, such as channel coding and transmission timing, when receiving control information outputted from the protocol processing unit 26. An uplink dedicated channel transmitting unit 29 carries out dedicated channel processes such as channel coding and transmission timing, when receiving a telephone number or the like outputted from the application processing unit 27.

A code generator 30 generates a spread code and a modulating unit 31 performs spread modulation on a signal outputted from the uplink common channel transmitting unit 28 or uplink dedicated channel transmitting unit 29 using the above-mentioned spread code.

A D/A converter 32 converts the modulated signal outputted from the modulating unit 31, which is a digital signal, into an analog signal. A frequency converting unit 33 converts the frequency of the modulated signal on which the D/A conversion is performed by the D/A converter 32 to output an RF signal. A power amplifying unit 34 amplifies the power of the RF signal, and outputs it to the antenna 11.

Figure 3:
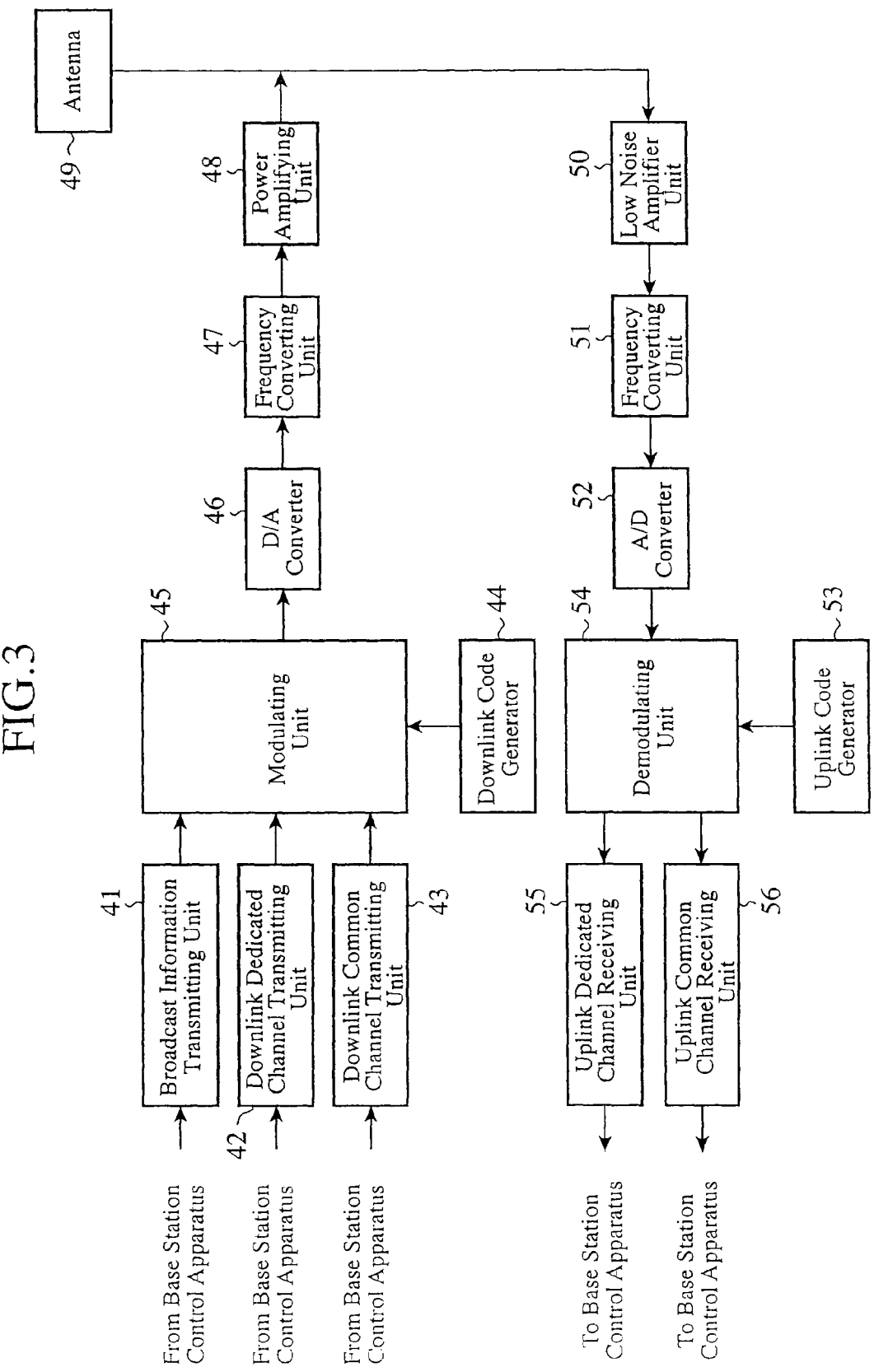
FIG. 3 is a block diagram showing a base station in accordance with embodiment 1 of the present invention.

FIG. 3 is a block diagram showing each base station in accordance with embodiment 1 of the present invention. In the figure, when receiving broadcast information from a corresponding base station control apparatus 4, a broadcast information transmitting unit 41 performs a coding process of putting the broadcast information onto a P-CCPCH. When receiving data or control information to be transmitted using a dedicated channel (DPCH: Dedicated Physical channel), which is transmitted from the corresponding base station control apparatus 4, a downlink dedicated channel transmitting unit 42 performs a coding process of putting the data or control information onto the DPCH. When receiving control information or multimedia data to be transmitted using an S-CCPCH, which is transmitted from the corresponding base station control apparatus 4, a downlink common channel transmitting unit 43 performs a coding process of putting the control information or multimedia data onto the S-CCPCH.

A downlink code generator 44 generates a channelization code and a scrambling code for downlinks. A modulating unit 45 performs spread modulation on a signal outputted from the broadcast information transmitting unit 41, downlink dedicated channel transmitting unit 42, or downlink common channel transmitting unit 43 using the codes for downlinks generated by the code generator 44.

A D/A converter 46 converts the modulated signal outputted from the modulating unit 45, which is a digital signal, into an analog signal. A frequency converting unit 47 converts the frequency of the modulated signal on which D/A conversion is performed by the D/A converter 46 to output an RF signal. A power amplifying unit 48 amplifies the power of the RF signal, and outputs it to an antenna 49.

When the antenna 49 receives a weak radio signal transmitted from a mobile communications terminal 6, a low noise amplifier unit 50 amplifies the radio signal. A frequency converting unit 51 converts the frequency of the radio signal amplified by the low noise amplifier unit 50 to output an RF signal. An A/D converter 52 converts the RF signal outputted from the frequency converting unit 51, which is an analog signal, into a digital signal.

An uplink code generator 53 generates a channelization code and a scrambling code for uplinks. A demodulating unit 54 demodulates the RF signal outputted from the A/D converter 52 using the scrambling code for uplinks which is generated by the code generator 53, and also demultiplexes the demodulated RF signal into channel-by-channel signals using the channelization code for uplinks which is generated by the code generator 53. An uplink dedicated channel receiving unit 55 channel-decodes a signal associated with each channel and transmits it to the corresponding base station control apparatus 4. An uplink common channel receiving unit 56 channel-decodes a signal associated with a common channel (RACH: Random Access Channel), and transmits it to the corresponding base station control apparatus 4.

Figure 4:
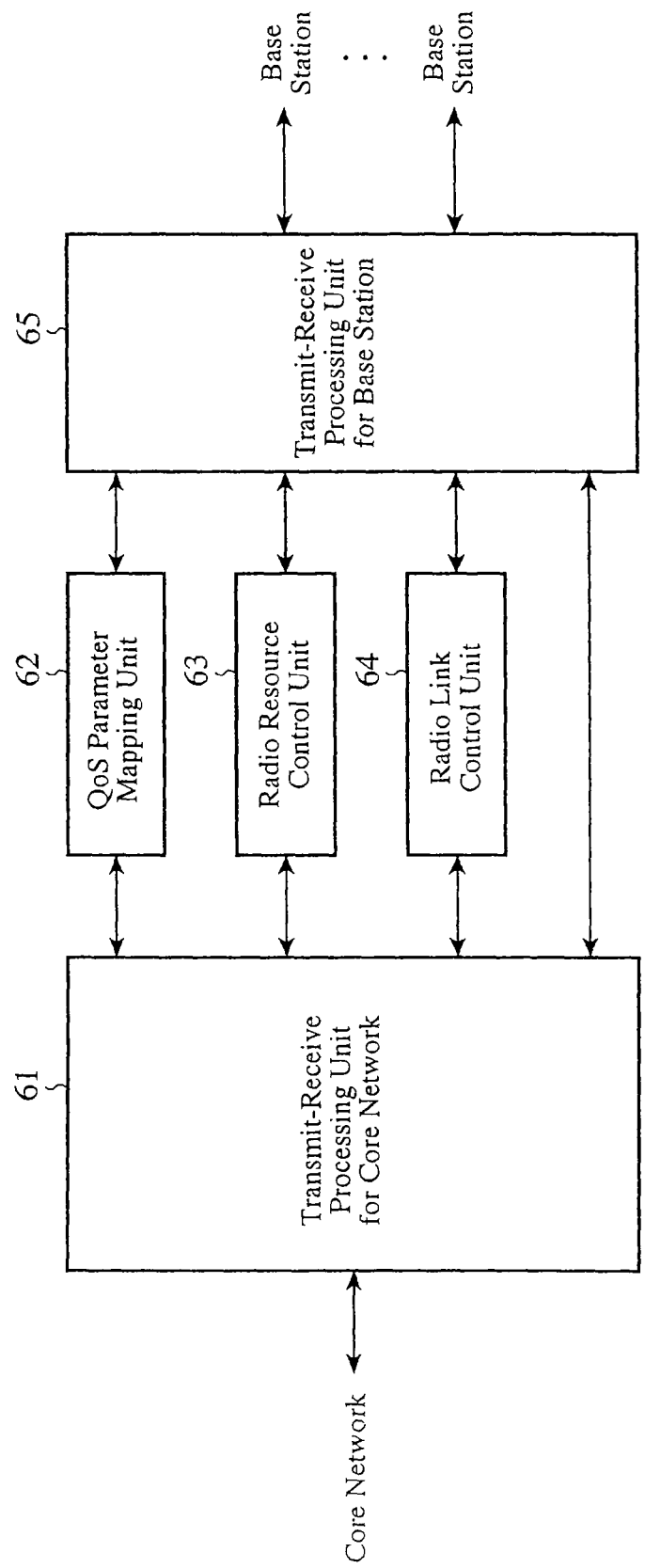
FIG. 4 is a block diagram showing a base station control apparatus in accordance with embodiment 1 of the present invention.

FIG. 4 is a block diagram showing each base control apparatus in accordance with embodiment 1 of the present invention. In the figure, a transmit-receive processing unit for core network carries out communications protocol processes, such as a process about a protocol for use with the core network, such as RANAP (Radio Access Network Application Protocol), and a process about a protocol for use with other base control apparatus, such as RNSAP (Radio Network Subsystem Application Part).

A QoS parameter mapping unit 62 acquires parameters of radio channels which satisfy requirements according to a QoS instruction from the core network. A radio resource control unit 63 carries out a process about radio resources, and also carries out control of mobile communications terminals 6 and notification of parameters using RRC signaling. A radio-link control unit 64 carries out buffering and control of retransmission of data via a radio link.

A transmit-receive processing unit 65 for base station carries out communications protocol processes such as a process about a protocol for use with base stations (Node-B), such as NBAP (NodeB Application Part).

However, how the functions of each base station control apparatus 4 are shared among the components is determined on the basis of its logical functions, and they are not necessarily separated clearly when they are actually implemented via hardware or software.

Figure 5:
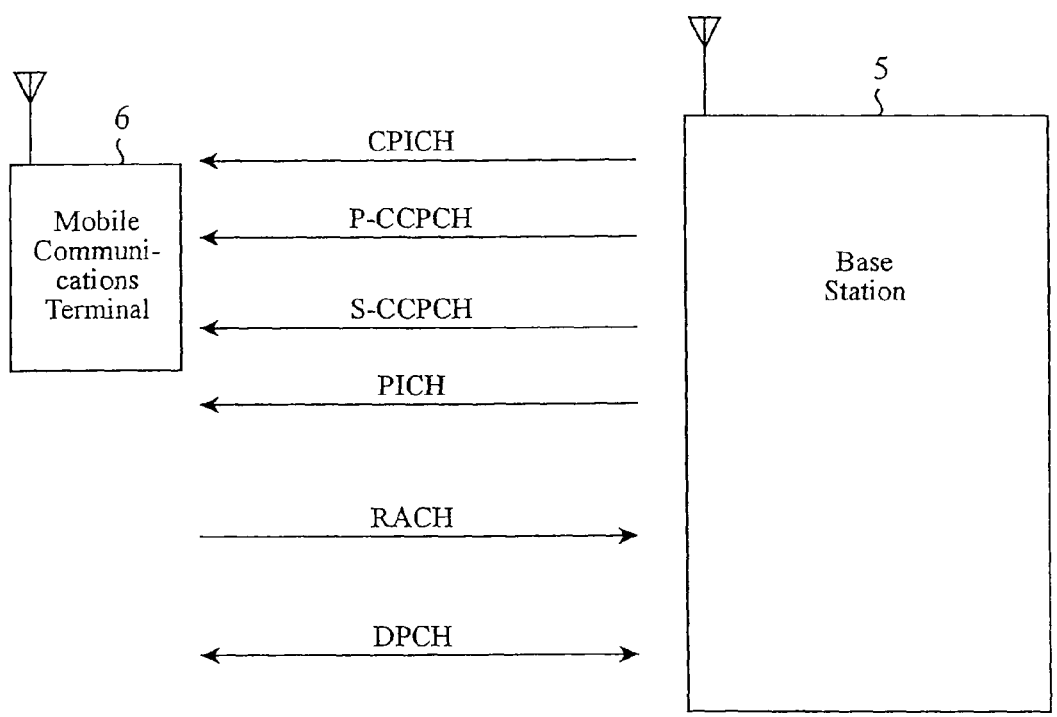
FIG. 5 is an explanatory diagram showing the configuration of channels between a mobile communications terminal and a base station.

FIG. 5 is an explanatory diagram showing the configuration of channels disposed between each mobile communications terminal 6 and each base station 5. In the example of FIG. 5, the configuration of channels in the case of using a W-CDMA method is shown. However, in actual fact, there is a possibility that a plurality of channels are used with them sharing a single channel.

First, a downlink physical channel from each base station 5 to each mobile communications terminal 6 will be explained.

A CPICH (Common Pilot Channel) which each base station uses when informing a reference of timing, and a P-CCPCH (Primary-Common Control Physical Channel) which each base station uses when notifying other broadcast information are disposed for all mobile communications terminals 6 which are staying in a control area under the control of each base station 5. The P-CCPCH is used as a channel BCH for broadcast information (Broadcast channel).

An S-CCPCH (Secondary-Common Control Physical Channel) which each base station 5 uses when transmitting signaling or data to each mobile communications terminal 6 is provided from each base station 5 to each mobile communications terminal 6. A plurality of S-CCPCHs can be provided.

A PICH (Paging Indicator channel) is provided as an indicator for downlink paging.

Next, uplink channels from each mobile communications terminal 6 to each base station 5 will be explained.

There is provided an RACH (Random Access Channel) as a common channel, and there is also provided, as each of uplink and downlink channels, a DPCH (Dedicated Physical Channel) which is individually established when each base station communicates with a specific mobile communications terminal 6. The DPCH is established as each of the uplink and downlink channels, and is used for communications of voice data, data, etc., or signaling by an upper layer. The DPCH can be divided into a DPDCH (Dedicated Physical Data Channel) which is a portion via which data are transmitted, and a DPCCH (Dedicated Physical Control Channel) which is a portion via which bits about control are transmitted.

The DPCH is called a dedicated channel since it is used by an individual terminal, while other channels are called common channels since each of them is used in common by two or more terminals.

Next, the operation of the radio communications system in accordance with this embodiment of the present invention will be explained.

First, the GGSN 2 extracts multimedia data about contents currently being stored in the service center 1, and then transmits the multimedia data to the SGSN 3.

When receiving the multimedia data from the GGSN 2, the SGSN 3 searches for one or more mobile communications terminals 6 which use the service of delivering the contents, and transmits the multimedia data about the contents in question to base station control apparatus 4 connected with base stations 5 which are accommodating those mobile communications terminals 6.

When receiving the multimedia data from the SGSN 3, each base station control apparatus 4 controls base stations 5 so that each of them delivers the multimedia data to target mobile communications terminals using the S-CCPCH.

Each target mobile communications terminal 6 receives the multimedia data delivered from one of the plurality of base stations 5 using the S-CCPCH.

However, when each target mobile communications terminal 6 is staying in the vicinity of the periphery of a control area under the control of a base station 5 which has delivered the multimedia data thereto, for example, the electric wave transmitted from the base station 5 may become weak and therefore the reception quality of the electric wave may degrade even if each mobile communications terminal 6 is staying in the control area.

Figure 6:
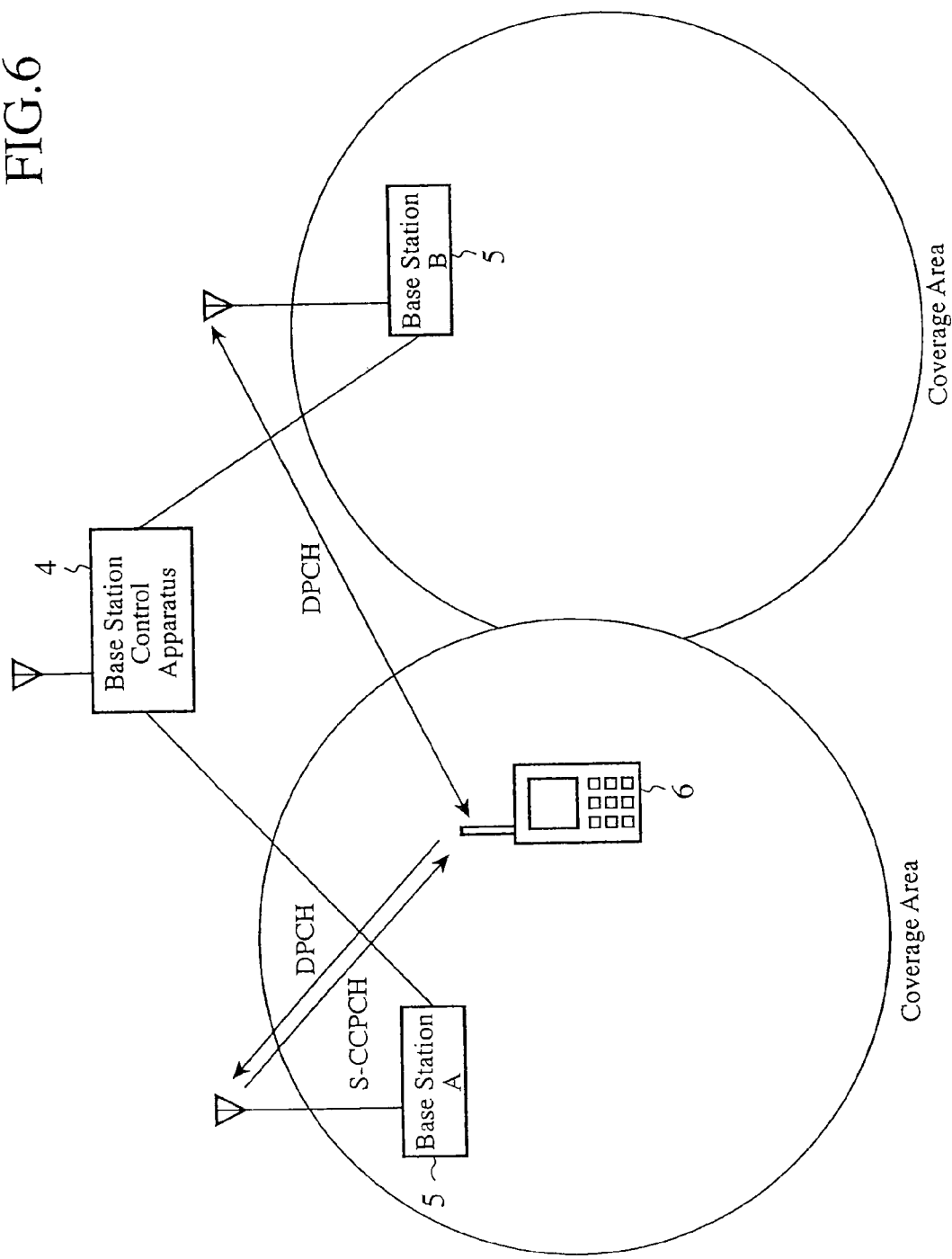
FIG. 6 is an explanatory diagram showing a base station to be monitored.

The reason why the reception quality of the S-CCPCH channel degrades when each mobile communications terminal is staying in the periphery of the control area under the control of the base station which has delivered the multimedia data thereto is as follows. For the sake of simplicity, assume that a base station control apparatus 4 is connected to a base station A and a base station B, and a mobile communications terminal 6 is staying in the vicinity of the periphery of the control area under the control of the base station A, as shown in FIG. 6.

In this case, since the distance between the mobile communications terminal 6 and the base station B is relatively short, a DPCH which is a dedicated channel is established between the mobile communications terminal 6 and the base station A, and may be also established between the mobile communications terminal 6 and the base station B.

When a DPCH is established between the mobile communications terminal 6 and each of the base stations A and B, the mobile communications terminal 6 can receive data transmitted from each of the base stations A and B using the DPCH, and can improve the reception quality of the data by maximum-ratio-combining both of the data from the base stations A and B.

However, since the S-CCPCH associated with the base stations A and B which are common channels are established between the mobile communications terminal 6 and the base stations A and B, respectively, the mobile communications terminal 6 cannot carry out the maximum-ratio-combining of both of the data transmitted from the base stations A and B, and this results in the degradation in the reception quality of the data.

Therefore, in order to improve the reception quality of the S-CCPCH, the base station 5 only has to transmit the data by increasing the power which is assigned to the S-CCPCH. However, the reception quality of information transmitted using another channel may degrade since the transmission power assigned to the other channel becomes low relatively when the base station 5 increases the power which is assigned to the S-CCPCH, as mentioned above, In contrast, in accordance with this embodiment 1, each mobile communications terminal 6 is so constructed as shown in FIG. 2 in order to improve the reception quality of the S-CCPCH without each base station 5 increasing the power which is assigned to the S-CCPCH.

Figure 7:
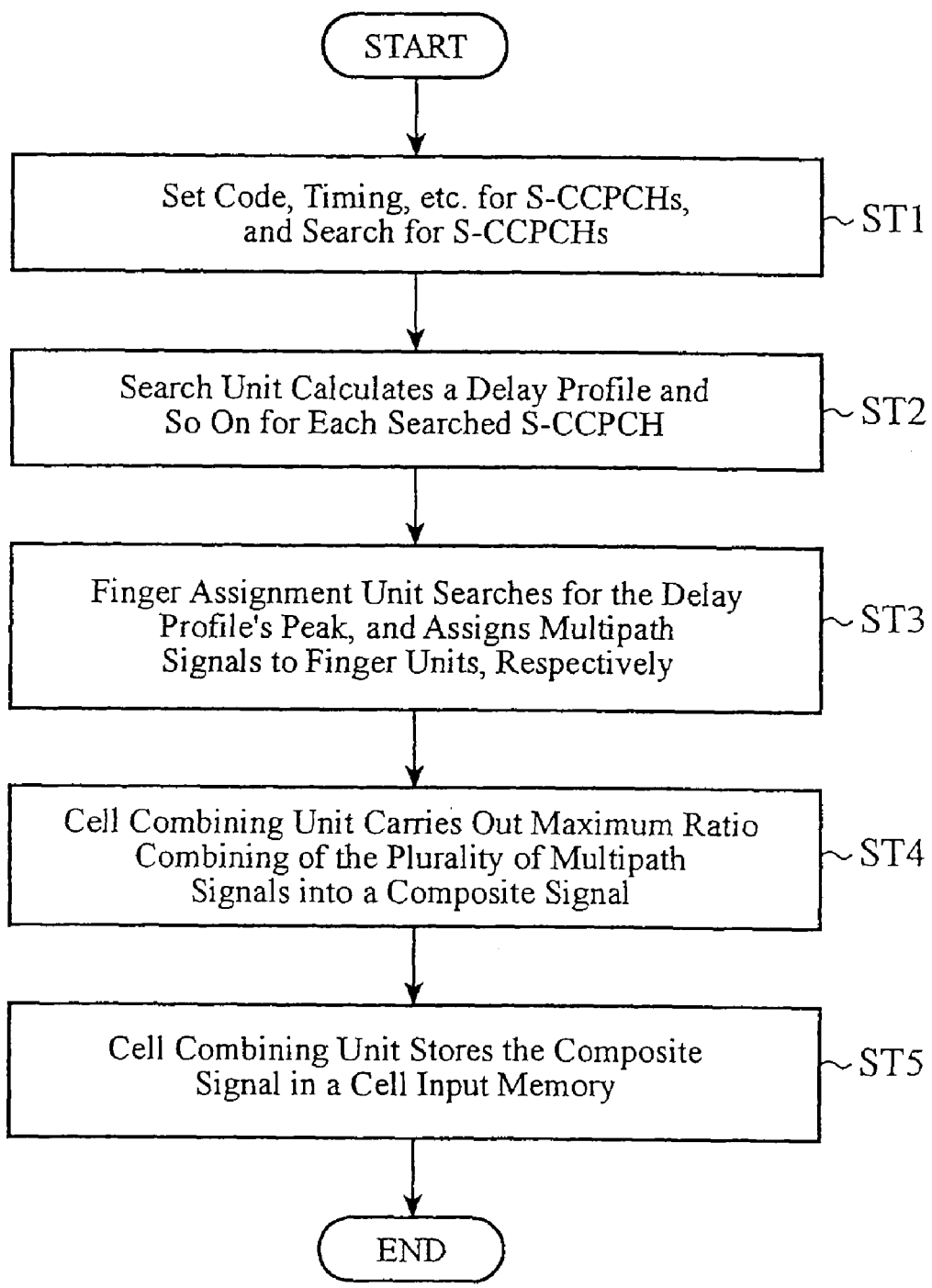
FIG. 7 is a flow chart showing processing carried out by the mobile communications terminal in accordance with embodiment 1 of the present invention.
Figure 8:
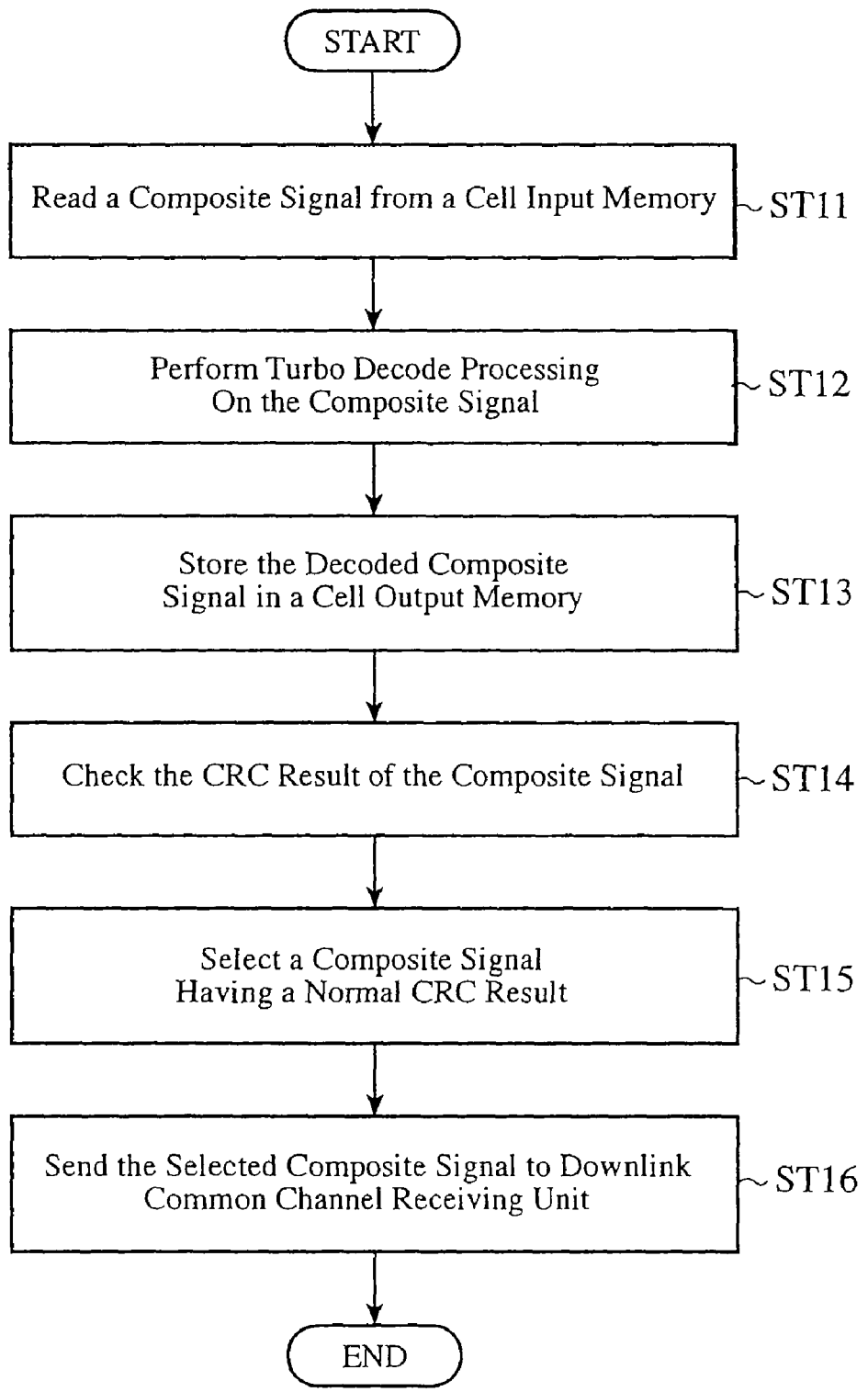
FIG. 8 is a flow chart showing the processing carried out by the mobile communications terminal in accordance with embodiment 1 of the present invention.

Hereafter, the operation of each mobile communications terminal 6 of FIG. 2 will be explained. FIGS. 7 and 8 are flow charts showing processing carried out by each mobile communications terminal in accordance with embodiment 1 of the present invention.

Although each mobile communications terminal 6 may be able to receive radio signals transmitted from three or more base stations 5 using the S-CCPCH, assume that since restrictions are placed on the hardware of the receive part of each mobile communications terminal 6, each mobile communications terminal 6 selects, as the target to be monitored, not all of the base stations 5, but monitors only base stations each of which stands a good chance of increasing the reception quality of the radio signal (i.e., base stations 5 each of which provides a high possibility that the reception quality is improved). In this case, as shown in FIG. 6, the mobile communications terminal 6 selects the base stations A and B as the target to be monitored and receives the radio signals transmitted from the base stations A and B. However, since the radio signals reach the mobile communications terminal 6 after passing through various paths from the base stations A and B, the radio signal transmitted from each of the base stations A and B is received, as a multipath signal, by the mobile communications terminal 6 a number of times.

Although it can be considered that each of the two or more base stations 5 does not transmit multimedia data all of a sudden, but transmits a pilot signals as a radio signal when no S-CCPCH is established between each of them and the mobile communications terminal 6, each of the two or more base stations 5 can transmit multimedia data to the mobile communications terminal 6 all of a sudden.

First, when the antenna 11 receives a multipath signal which is a radio signal transmitted from the base station A or B, the low noise amplifier unit 12 of the mobile communications terminal 6 amplifies the multipath signal.

When the low noise amplifier unit 12 amplifies the multipath signal, the frequency converting unit 13 converts the frequency of the multipath signal to generate and output an RF signal to the A/D converter 14.

When receiving the RF signal which is an analog signal from the frequency converting unit 13, the A/D converter 14 carries out analog-to-digital conversion of the RF signal to generate and output an RF signal which is a digital signal to both the RAKE combining unit 18 and search unit 15.

When receiving the RF signal which is a digital signal from the A/D converter 14, the search unit 15 detects a base station 5 which is the transmit source of the multipath signal in question by carrying out cell search processing. In other words, the search unit 15 checks to see whether the multipath signal received by the antenna 11 has been transmitted from either the base station A or the base station B.

To be more specific, since the multipath signal varies under the influence of fading as the mobile communications terminal 6 moves, the search unit 15 sets a code, timing, and so on for the S-CCPCH and searches for the S-CCPCH (in step ST1), and calculates a delay profile and so on for the searched S-CCPCH (i.e., the S-CCPCH associated with the base station A or S-CCPCH associated with the base station B) (in step ST2). The finger assignment control unit 17 searches for the peak of the delay profile calculated by the search unit 15, and controls the RAKE combining unit 18 so that a multipath signal at the peak is assigned to the finger unit of the RAKE combining unit 18 (in step ST3).

At this time, since the active set of base stations 5 to be monitored includes only the base stations A and B, when the transmit source of the multipath signal received by the antenna 11 is the base station A and the RF signal outputted from the A/D converter 14 has not been assigned to the finger unit 18a of the RAKE combining unit 18, the finger assignment control unit 17 controls the RAKE combining unit 18 so that the RF signal (referred to as the RF signal A-1 from here on) is assigned to the finger unit 18a.

In contrast, when the transmit source of the multipath signal received by the antenna 11 is the base station A and the RF signal outputted from the A/D converter 14 has been assigned to the finger unit 18a of the RAKE combining unit 18, the finger assignment control unit 17 controls the RAKE combining unit 18 so that the RF signal (referred to as the RF signal A-2 from here on) is assigned to the finger unit 18b.

When the transmit source of the multipath signal received by the antenna 11 is the base station B and the RF signal outputted from the A/D converter 14 has not been assigned to the finger unit 18c of the RAKE combining unit 18, the finger assignment control unit 17 controls the RAKE combining unit 18 so that the RF signal (referred to as the RF signal B-1 from here on) is assigned to the finger unit 18c.

In contrast, when the transmit source of the multipath signal received by the antenna 11 is the base station B and the RF signal outputted from the A/D converter 14 has been assigned to the finger unit 18c of the RAKE combining unit 18, the finger assignment control unit 17 controls the RAKE combining unit 18 so that the RF signal (referred to as the RF signal B-2 from here on) is assigned to the finger unit 18d.

The code generator 16 generates a scrambling code corresponding to the base station 5 detected by the search unit 15. For example, when the base station 5 which is the transmit source of the multipath signal in question is the base station A, the code generator 16 generates a scrambling code corresponding to the base station A. In contrast, when the base station 5 which is the transmit source of the multipath signal in question is the base station B, the code generator 16 generates a scrambling code corresponding to the base station B.

When the finger units 18a to 18d of the RAKE combining unit 18 receive the RF signals A-1, A-2, B-1, and B-2, respectively, they demodulate them using the scrambling codes generated by the code generator 16, respectively.

When the RF signals A-1 and A-2 are assigned to the finger units 18a and 18b, respectively, the cell combining unit 18e of the RAKE combining unit 18 maximum-ratio-combines the RF signals A-1 and A-2 into a composite signal (referred as a composite signal A), and stores the composite signal A in the cell input memory 19a (in steps ST4 and ST5).

On the other hand, when the RF signals B-1 and B-2 are assigned to the finger units 18c and 18d, respectively, the cell combining unit 18f of the RAKE combining unit 18 maximum-ratio-combines the RF signals B-1 and B-2 into a composite signal (referred as a composite signal B), and stores the composite signal B in the cell input memory 19b (in steps ST4 and ST5).

When the cell combining unit 18e of the RAKE combining unit 18 stores the composite signal A in the cell input memory 19a, the decoding unit 20 decodes the composite signal A by performing turbo decode processing on the composite signal A (in steps ST11 and ST12), and stores the decoded composite signal A in the cell output memory 21a (in step ST13).

On the other hand, when the cell combining unit 18f of the RAKE combining unit 18 stores the composite signal B in the cell input memory 19b, the decoding unit 20 decodes the composite signal B by performing turbo decode processing on the composite signal B (in steps ST11 and ST12), and stores the decoded composite signal B in the cell output memory 21b (in step ST13).

The selecting unit 22 selects a composite signal having a good decoded result from the decoded composite signals A and B respectively stored in the cell output memories 21a and 21b, and outputs the selected composite signal to the downlink common channel receiving unit 23.

For example, the selecting unit 22 checks the CRC results of the decoded composite signals A and B (in step ST14) so as to identify one of the composite signals having a normal CRC result.

The selecting unit 22 then selects the composite signal having a normal CRC result (in step ST15), and outputs the selected composite signal to the downlink common channel receiving unit 23 (in step ST16).

When receiving the composite signal selected by the selecting unit 22, the downlink common channel receiving unit 23 outputs the selected composite signal to the protocol processing unit 26 if the composite signal is control information, whereas it outputs the selected composite signal to the application processing unit 27 if the composite signal is application data.

When receiving the composite signal which is control information from the downlink common channel receiving unit 23, the protocol processing unit 26 carries out processing about communications control, such as establishment or release of a channel, or handover, according to the control information.

In other words, when the composite signal outputted from the downlink common channel receiving unit 23 is associated with a multipath signal transmitted from the base station A, the protocol processing unit 26 carries out processing such as communications control processing for establishing an S-CCPCH between the base station A and the mobile communications terminal, whereas when the composite signal outputted from the downlink common channel receiving unit 23 is associated with a multipath signal transmitted from the base station B, the protocol processing unit 26 carries out processing such as communications control processing for establishing an S-CCPCH between the base station B and the mobile communications terminal.

After that, the search unit 15 searches for a plurality of multipath signals associated with the S-CCPCH established by the protocol processing unit 26, the RAKE combining unit 18 maximum-ratio-combines the plurality of multipath signals searched for by the search unit 15 into a composite signal, and the decoding unit 20 stores the composite signal in the cell output memory 21a.

When receiving the composite signal which is application data from the downlink common channel receiving unit 23 after the S-CCPCH has been established by the protocol processing unit 26 between the base station A or B and the mobile communications terminal in the above-mentioned way, the application processing unit 27 carries out transform processing, such as voice codec and image codec, according to the application data.

Since the selecting unit 22 does not carry out the selection process of selecting a composite signal when the decoded composite signal stored in the cell output memory 21a is broadcast information, the broadcast information receiving unit 24 receives the composite signal and outputs it to the protocol processing unit 26.

Since the selecting unit 22 does not carry out the process of selecting a composite signal when the decoded composite signal stored in the cell output memory 21a is application data or control information and has been transmitted to the mobile communications terminal by the base station 5 using a downlink dedicated channel, the downlink dedicated channel receiving unit 25 receives the composite signal stored in the cell output memory 21a and outputs the composite signal to the application processing unit 27 when the composite signal is application data, whereas it outputs the composite signal to the protocol processing unit 26 when the composite signal is control information.

As can be seen from the above description, each mobile communications terminal in accordance with this embodiment 1 divides a plurality of multipath signals associated with radio signals transmitted thereto by a plurality of base stations 5 using an S-CCPCH into groups by base station, i.e., by transmit source, maximum-ratio-combines a plurality of multipath signals associated with each same base station 5, i.e., each same transmit source into a composite signal, decodes the composite signal, and selects a composite signal having a good decoded result from among decoded composite signals. Therefore, the present embodiment offers an advantage of being able to improve the reception quality of radio signals without each base station 5 controlling its transmission power.

In accordance with this embodiment 1, the finger units 18a and 18b of each mobile communications terminal receive RF signals A-1 and A-2 associated with a multipath signal transmitted from a base station A, respectively, and the finger units 18c and 18d of each mobile communications terminal receive RF signals B-1 and B-2 associated with a multipath signal transmitted from a base station B, respectively, as previously mentioned. As an alternative, RF signals can be arbitrarily assigned to the finger unit 18a to 18d, respectively. For example, the finger units 18a, 18b, and 18c can receive the RF signals A-1 and A-2 and an RF signal A-3 associated with the multipath signal transmitted from the base station A, respectively, and the finger unit 18d can receive the RF signal B-1 associated with the multipath signal transmitted from the base station B.

In addition, in accordance with this embodiment 1, the RAKE combining unit 18 includes the cell combining units 18e and 18f, as previously mentioned. As an alternative, the RAKE combining unit 18 can include only one cell combining unit having the functions of the cell combining units 18e and 18f.

Furthermore, in general, the hardware of the decoding unit 20 has a large circuit structure. Therefore, in accordance with this embodiment 1, the decoding unit 20 carries out decode processing with time division, as previously mentioned. Needless to say the decoding unit 20 can alternatively include two decoding units.

In addition, in accordance with this embodiment 1, each mobile communications terminal includes the two cell output memories 21a and 21b, as well as the two cell input memory 19a and 19b, as previously mentioned. Needless to say each mobile communications terminal can alternatively include only a cell output memory and only a single cell input memory.

Embodiment 2

Figure 9:
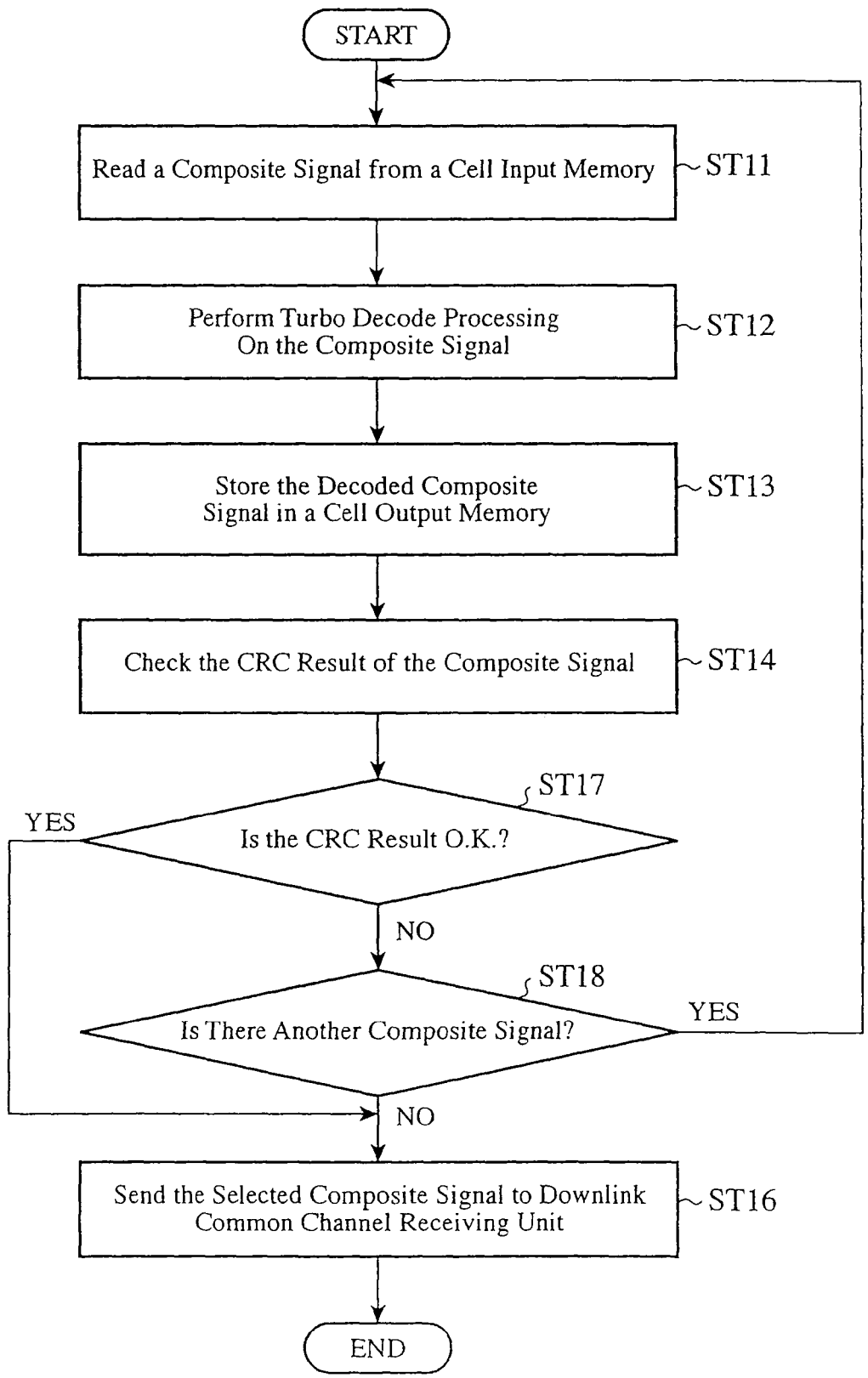
FIG. 9 is a flow chart showing processing carried out by a mobile communications terminal in accordance with embodiment 2 of the present invention.

In accordance with above-mentioned embodiment 1, the selecting unit 22 selects a composite signal having a good decoded result from decoded composite signal A and B respectively stored in the cell output memories 21a and 21b, and outputs the selected composite signal to the downlink common channel receiving unit 23, as previously mentioned. As an alternative, the selecting unit 22 can check to see whether the decoded composite signal A stored in the cell output memory 21a has a good decoded result, for example, as shown in FIG. 9, and, when determining that the decoded result is good, can output the decoded composite signal A to the downlink common channel receiving unit 23 without checking to see whether the decoded composite signal B stored in the cell output memory 21b has a good decoded result (in steps ST17 and ST18). When determining that the decoded result of the decoded composite signal A stored in the cell output memory 21a is not good, the selecting unit 22 further checks to see whether or not the decoded result of the decoded composite signal B stored in the cell output memory 21b is good, and, when determining that the decoded result is good, outputs the decoded composite signal B to the downlink common channel receiving unit 23.

In accordance with this embodiment 2, since the selecting unit does not need to perform the process of checking to see whether or not other decoded results are good if determining that the previously-decoded result is good, useless processings can be reduced.

Embodiment 3

In above-mentioned embodiment 1, the example in which the active set includes only the base stations A and B is shown. There can be provided an update request means for comparing the reception levels of radio signals transmitted from a plurality of base stations 5 with one another, and for transmitting a request to update the active set according to the result of the comparison.

The search unit 15 and protocol control unit 26 of FIG. 2 constitute the update request means.

Figure 10:
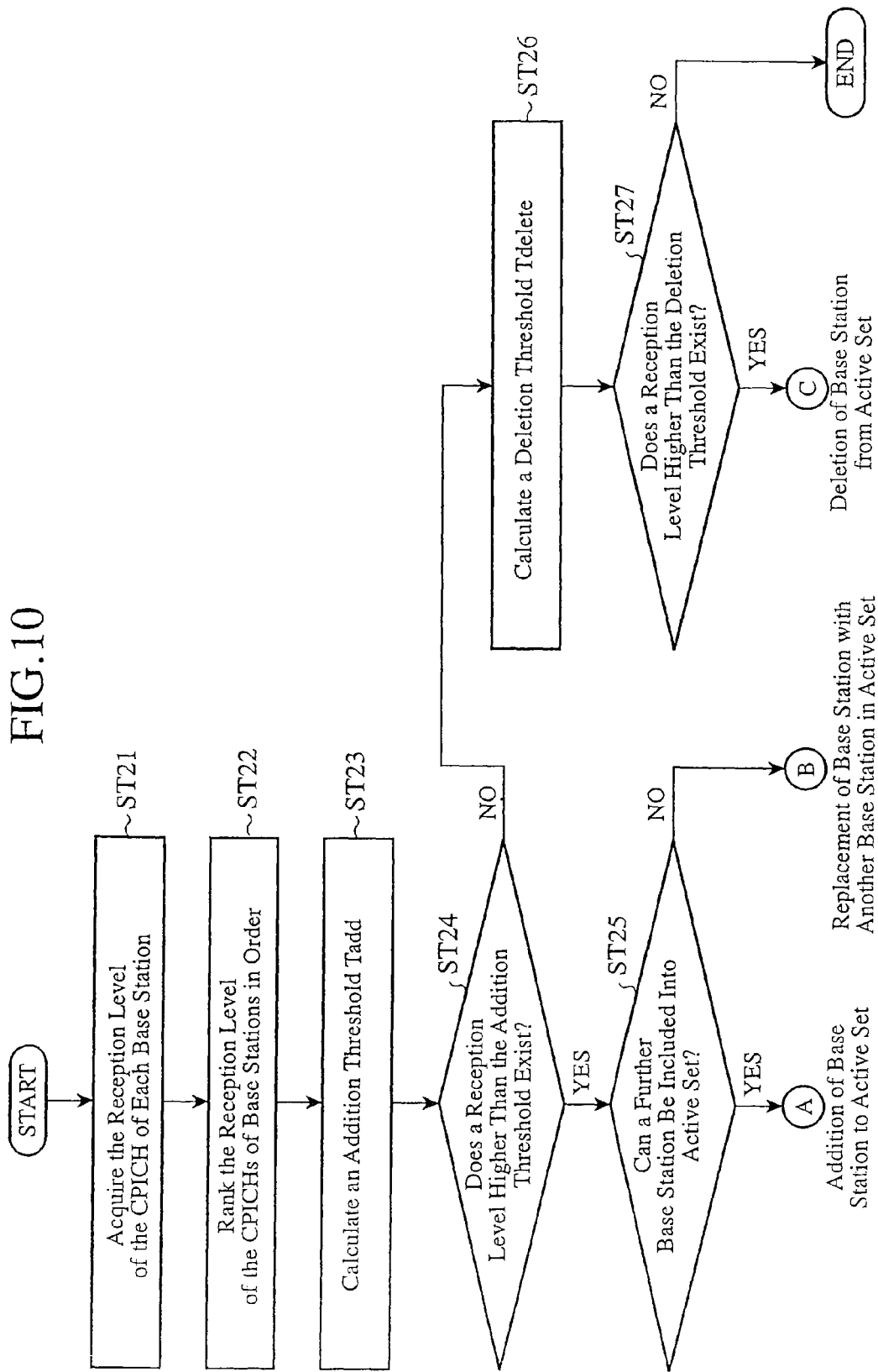
FIG. 10 is a flow chart showing processing carried out by a mobile communications terminal in accordance with embodiment 3 of the present invention.
Figure 11:
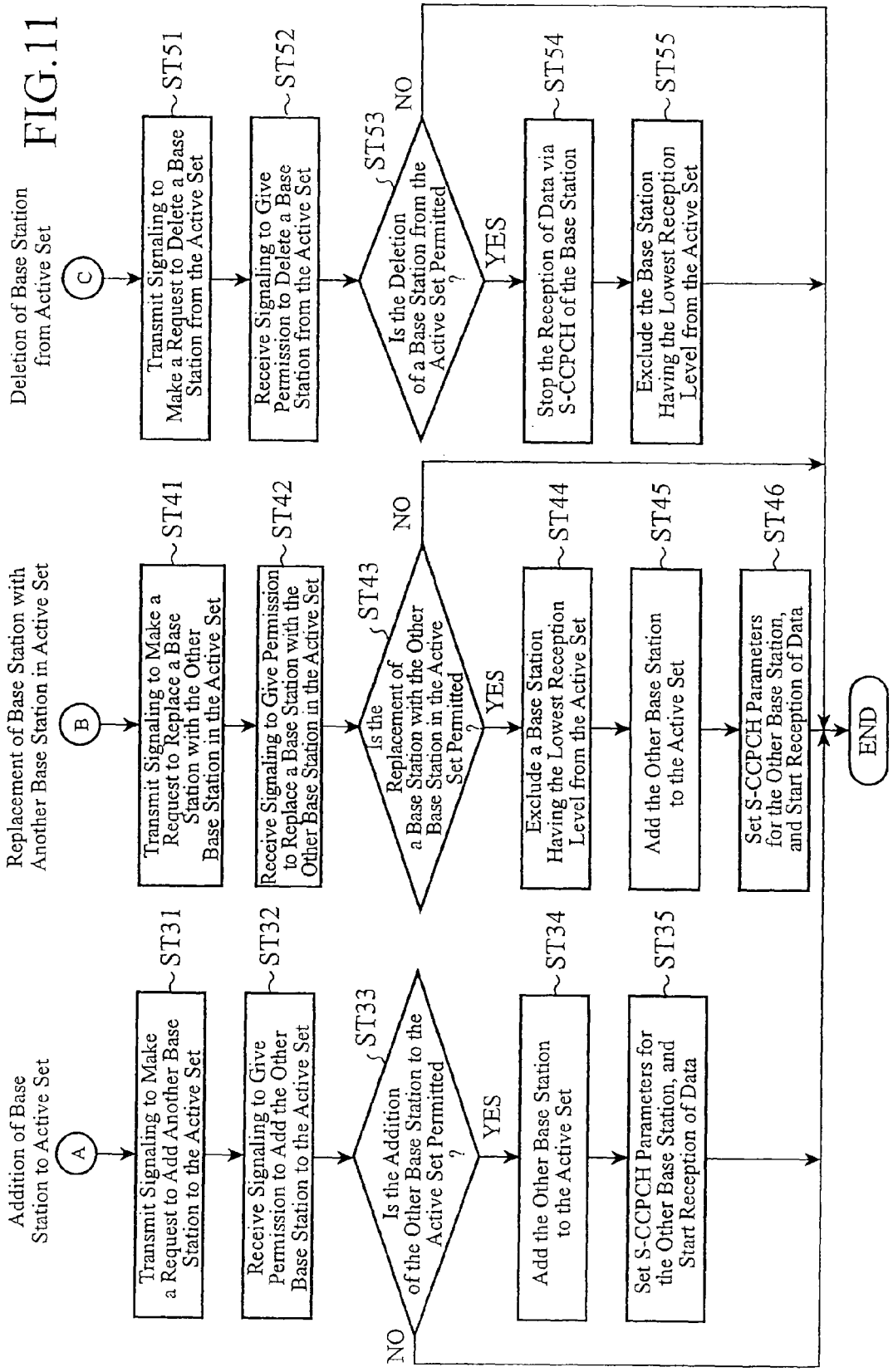
FIG. 11 is a flow chart showing the processing carried out by a mobile communications terminal in accordance with embodiment 3 of the present invention.

FIGS. 10 and 11 are flow charts showing processing carried out by each mobile communications terminal in accordance with embodiment 3 of the present invention.

Next, the operation of each mobile communications terminal in accordance with this embodiment of the present invention will be explained.

A path loss (path loss) or CPICH Ec/No (energy-vs.-noise per one chip of CPICH), CPICH-RSCP (CPICH Received Signal Code Power: power assigned to the code of CPICH) can be defined as the reception level of a CPICH, for example.

The search unit 15 acquires the reception level of the CPICH of each base station 5 which is not included in the current active set, as well as the reception level of the CPICH of each base station 5 included in the active set (in step ST21).

When acquiring these reception levels of the CPICHs of the base stations 5, the search unit 15 then calculates an addition threshold Tadd (in step ST23) by ranking the reception levels of the CPICHs in order (in step ST22).

In other words, the search unit 15 sets the lowest one of the reception levels of the CPICHs of the base stations 5 included in the active set to X, and calculates an addition threshold Tadd from the lowest CPICH reception level X and a hysteresis parameter H for preventing variations in the active set. In this case, the search unit 15 can receive the addition threshold Tadd from an upper layer instead of calculating the addition threshold Tadd.

$$Tadd=X+H/2$$

The search unit 15 checks to see whether or not there is a reception level which continues to exceed the above-mentioned addition threshold Tadd throughout a predetermined time period T (the time period T is a timer value for removing instant variations) in the reception levels of the CPICHs of the base stations 5 which are not included in the current active set (in step ST24).

When there is a reception level which continues to exceed the above-mentioned addition threshold Tadd throughout the predetermined time period T in the reception levels of the CPICHs of the base stations 5 which are not included in the current active set, the search unit 15 examines whether a further base station can be accommodated in the active set. In other words, the search unit 15 examines whether the mobile communications terminal can bear the increase in the load of carrying out the receiving processing which is caused by the addition of a base station 5 into the active set (in step ST25), and, when determining that a further base station can be accommodated in the active set, determines that it will carry out a process of adding a base station into the active set as will be mentioned below. In this case, the search unit 15 shifts to processing of a terminal A of FIG. 11.

On the other hand, when determining that any further base station cannot be accommodated in the active set, the search unit 15 determines that it will carry out a process of replacing a base station of the current active set with another base station as will be mentioned below. In this case, the search unit 15 shifts to processing of a terminal B of FIG. 11.

When there is no reception level which continues to exceed the addition threshold Tadd throughout the predetermined time period T in the reception levels of the CPICHs of the base stations 5 which are not included in the current active set, the search unit 15 calculates a deletion threshold Tdelete from both the lowest one X of the reception levels of the CPICHs of the base stations 5 included in the active set, and the hysteresis parameter H (in step ST26). As an alternative, the search unit 15 can receive the deletion threshold Tdelete from an upper layer instead of calculating the deletion threshold Tdelete.

$$Tdelete = X - H/2$$

The search unit 15 then checks to see whether or not there is a reception level which continues to be lower than the above-mentioned deletion threshold Tdelete throughout the predetermined time period T in the reception levels of the CPICHs of the base stations 5 which are included in the current active set (in step ST24).

When there is a reception level which continues to be lower than the deletion threshold Tdelete throughout the predetermined time period T in the reception levels of the CPICHs of the base stations 5 which are included in the current active set, the search unit 15 determines that it will carry out a process of deleting a corresponding base station from the active set as will be mentioned below. In this case, the search unit 15 shifts to processing of a terminal C of FIG. 11.

On the other hand, when there is no reception level which continues to be lower than the deletion threshold Tdelete throughout the predetermined time period T in the reception levels of the CPICHs of the base stations 5 which are included in the current active set, the search unit 15 ends the processing without carrying out the process of updating the active set.

The Process of Adding a Base Station into the Active Set

When the search unit 15 determines implementation of the process of adding a base station to the active set, the protocol processing unit 26 transmits addition request signaling indicating a request to add a base station to the active set to a base station 5 (in step ST31).

In other words, the protocol processing unit 26 outputs the addition request signaling indicating a request to add a base station to the active set to the uplink dedicated channel transmitting unit 29, and the uplink dedicated channel transmitting unit 29 carries out dedicated channel processing to outputs the addition request signaling to the modulating unit 31.

The modulating unit 31 performs spread modulation on the addition request signaling outputted from the uplink dedicated channel transmitting unit 29 using a spread code generated by the code generator 30.

The D/A converter 32 converts the modulated signal outputted from the modulating unit 31, which is a digital signal, into an analog signal, the frequency converting unit 33 converts the frequency of the modulated signal on which the digital-to-analog conversion is performed by the D/A converter 32 to generate and output an RF signal, and the power amplifying unit 34 amplifies the power of the RF signal and outputs it to the antenna 11.

Thus, the addition request signaling indicating the request to add a base station to the active set is transmitted to a base station 5, and the base station 5 transmits the addition request signaling to a corresponding base station control apparatus 4.

When the base station control apparatus 4 permits the addition of a base station to the active set, the base station transmits addition permission signaling indicating permission to add a base station to the active set (including the S-CCPCH parameters of the base station 5 which is permitted to be newly added to the active set) to the mobile communications terminal 6 using a DPCH which is a dedicated channel.

When the antenna 11 receives the addition permission signaling which is transmitted from the base station 5, and the protocol processing unit 26 of the mobile communications terminal 6 then receives the addition permission signaling from the downlink dedicated channel receiving unit 25 in the same way as previously mentioned in embodiment 1 (in step ST32), the protocol processing unit 26 determines whether or not the addition of a base station to the active set has been permitted by analyzing the addition permission signaling (in step ST33).

When determining that the addition of a base station to the active set has been permitted, the protocol processing unit 26 refers to the S-CCPCH parameters included in the addition permission signaling indicating permission to add a base station to the active set, and identifies the base station 5 which is to be added to the active set and then adds the base station 5 to the active set (in step ST34).

The protocol processing unit 26 then notifies the S-CCPCH parameters to the search unit 15, finger assignment control unit 17, and RAKE combining unit 18.

After that, the mobile communications terminal starts a process of receiving data associated with the S-CCPCH of the base stations 5 of the active set including the added base station 5 (in step ST35).

The Process of Replacing a Base Station of the Active Set with Another Base Station When the search unit 15 determines implementation of the process of replacing a base station of the active set with another base station, the protocol processing unit 26 transmits replacement request signaling indicating a request to replace a base station of the active set with another base station to a base station 5 in the same way that it transmits addition request signaling indicating a request to add a base station to the active set (in step ST41).

Thus, the replacement request signaling indicating a request to replace a base station of the active set with another base station is transmitted to a base station 5, and the base station 5 transmits the replacement request signaling to a corresponding base station control apparatus 4.

When the base station control apparatus 4 permits the replacement of a base station of the active set with another base station, the base station 5 transmits replacement permission signaling indicating permission to replace a base station of the active set with another base station (including the S-CCPCH parameters of the other base station 5 which is permitted to be newly added to the active set) to the mobile communications terminal 6 using a DPCH.

When the antenna 11 receives the replacement request signaling indicating a request to replace a base station of the active set with another base station which is transmitted from the base station 5, and the protocol processing unit 26 of the mobile communications terminal 6 then receives the replacement request signaling from the downlink dedicated channel receiving unit 25 in the same way as previously mentioned in embodiment 1 (in step ST42), the protocol processing unit 26 determines whether or not the replacement of a base station of the active set with another base station has been permitted by analyzing the replacement permission signaling (in step ST43).

When determining that the replacement of a base station of the active set with another base station has been permitted, the protocol processing unit 26 excludes a base station 5 having the lowest reception level from the base stations 5 included in the current active set (in step ST44).

The protocol processing unit 26 further refers to the S-CCPCH parameters included in the replacement permission signaling indicating permission to replace a base station of the active set with another base station, and identifies the other base station 5 which is to be added to the active set and then adds the other base station 5 to the active set (in step ST45).

The protocol processing unit 26 then notifies the S-CCPCH parameters to the search unit 15, finger assignment control unit 17, and RAKE combining unit 18.

After that, the mobile communications terminal starts a process of receiving data associated with the S-CCPCH of the base stations 5 of the active set including the other base station 5 which is added to the active set in place of the excluded base station (in step ST46).

The Process of Deleting a Base Station from the Active Set

When the search unit 15 determines that it will carryout implementation of the process of deleting a base station from the active set, the protocol processing unit 26 transmits deletion request signaling indicating a request to delete a base station from the active set to a base station 5 in the same way that it transmits addition request signaling indicating a request to add a base station to the active set (in step ST51).

Thus, the deletion request signaling indicating a request to delete a base station from the active set is transmitted to a base station 5, and the base station 5 transmits the deletion request signaling to a corresponding base station control apparatus 4.

When the base station control apparatus 4 permits the deletion of a base station from the active set, the base station 5 transmits deletion permission signaling indicating permission to delete a base station from the active set to the mobile communications terminal 6 using a DPCH.

When the antenna 11 receives the deletion permission signaling indicating a permission to delete a base station from the active set which is transmitted from the base station 5, and the protocol processing unit 26 of the mobile communications terminal 6 then receives the deletion permission signaling from the downlink dedicated channel receiving unit 25 in the same way as previously mentioned in embodiment 1 (in step ST52), the protocol processing unit 26 determines whether or not the deletion of a base station from the active set has been permitted by analyzing the deletion permission signaling (in step ST53).

When determining that the deletion of a base station from the active set has been permitted, the protocol processing unit 26 stops the process of receiving data associated with the S-CCPCH of a base station 5 having the lowest reception level which is included in the base stations 5 of the current active set (in step ST54), and excludes the base station 5 having the lowest reception level from the current active set (in step ST55).

Figure 12:
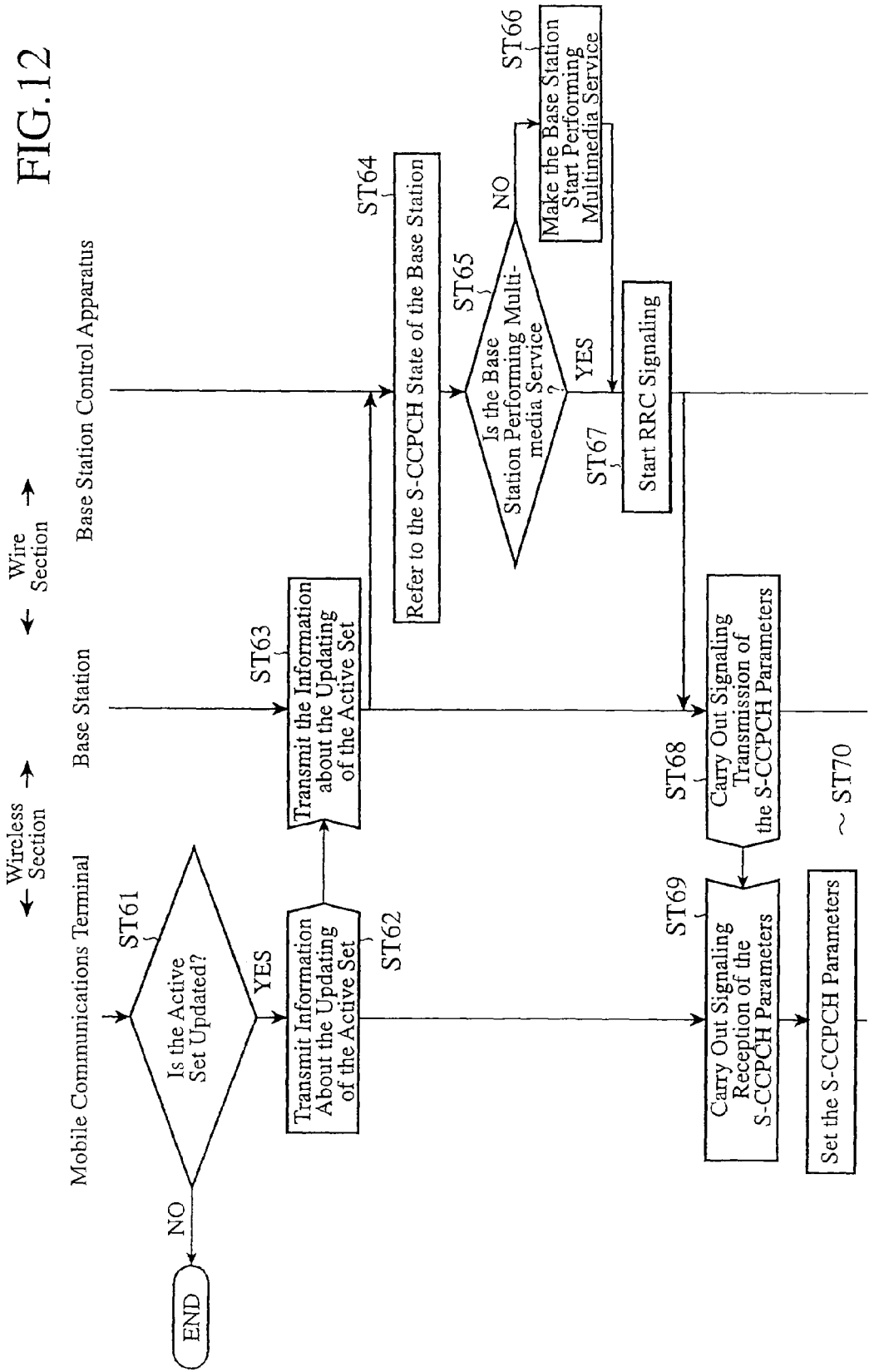
FIG. 12 is a sequence diagram showing signaling for updating of an active set in a radio communications system.

FIG. 12 is a sequence diagram showing signaling indicating updating of the active set in the radio communications system. Hereafter, exchange of information among a mobile communications terminal 6, a base station 5, and a base station control apparatus 4 will be explained with reference to FIG. 12.

When updating the active set in the above-mentioned way (in step ST61), the mobile communications terminal 6 transmits active set update information indicating that the active set has been updated to the base station 5 using a RACH which is a common channel (in step ST62).

When receiving the active set update information from the mobile communications terminal 6, the base station 5 transmits the active set update information to the base station control apparatus 4 (in step ST63).

When receiving the active set update information from the base station 5, the base station control apparatus 4 refers to the state of the S-CCPCH of a base station 5 which has been newly included in the active set (in step ST64). In other words, the base station control apparatus checks to see whether the base station 5 newly included in the active set is currently carrying out a multimedia service.

When determining that the base station 5 newly included in the active set is not currently carrying out any multimedia service, the base station control apparatus instructs the base station 5 to start performing a multimedia service (in step ST66).

The base station control apparatus 4 then acquires S-CCPCH parameters (e.g., timing, a code, etc.) and information about the state of the service being started, and starts RRC (Radio Resource Control) signaling (in step ST67).

The base station 5 receives the S-CCPCH parameters from the base station control apparatus 4, and carries out signaling transmission of the S-CCPCH parameters using, for example, a CPICH which is a common channel (in step ST68).

When carrying out signaling reception of the S-CCPCH parameters from the base station 5 (in step ST69), the mobile communications terminal 6 sets the S-CCPCH parameters so as to carry out a process of receiving data (in step ST70).

As can be seen from the above description, each mobile communications terminal in accordance with this embodiment 3 includes an update request means for comparing the reception levels of radio signal transmitted from a plurality of base stations 5, and for transmitting a request to update the active set according to the result of the comparison. Therefore, the present embodiment offers an advantage of being able to secure the reception quality of radio signals even if each mobile communications terminal 6 moves.

In accordance with this embodiment 3, each mobile communications terminal 6 transmits a request to update the active set to a base station 5, as previously mentioned. When a dedicated channel has been established with the base station 5, each mobile communications terminal 6 can apply an active set of dedicated channels to common channels, and, in this case, does not need to transmit a request to update the active set to any base station 5.

Embodiment 4

In accordance with above-mentioned embodiment 3, each mobile communications terminal 6 compares the reception levels of radio signals transmitted from a plurality of base stations 5, and transmits a request to update the active set to a base station 5 according to the result of the comparison, as previously explained. Each mobile communications terminal 6 can alternatively include a monitor target updating means for, when updating the active set, receiving required broadcast information from a base station 5, and for referring to the broadcast information to update the active set, thereby eliminating the participation of base stations 5 in the updating of the active set. The search unit 15 and protocol control unit 26 of FIG. 2 constitute the monitor target updating means.

Figure 13:
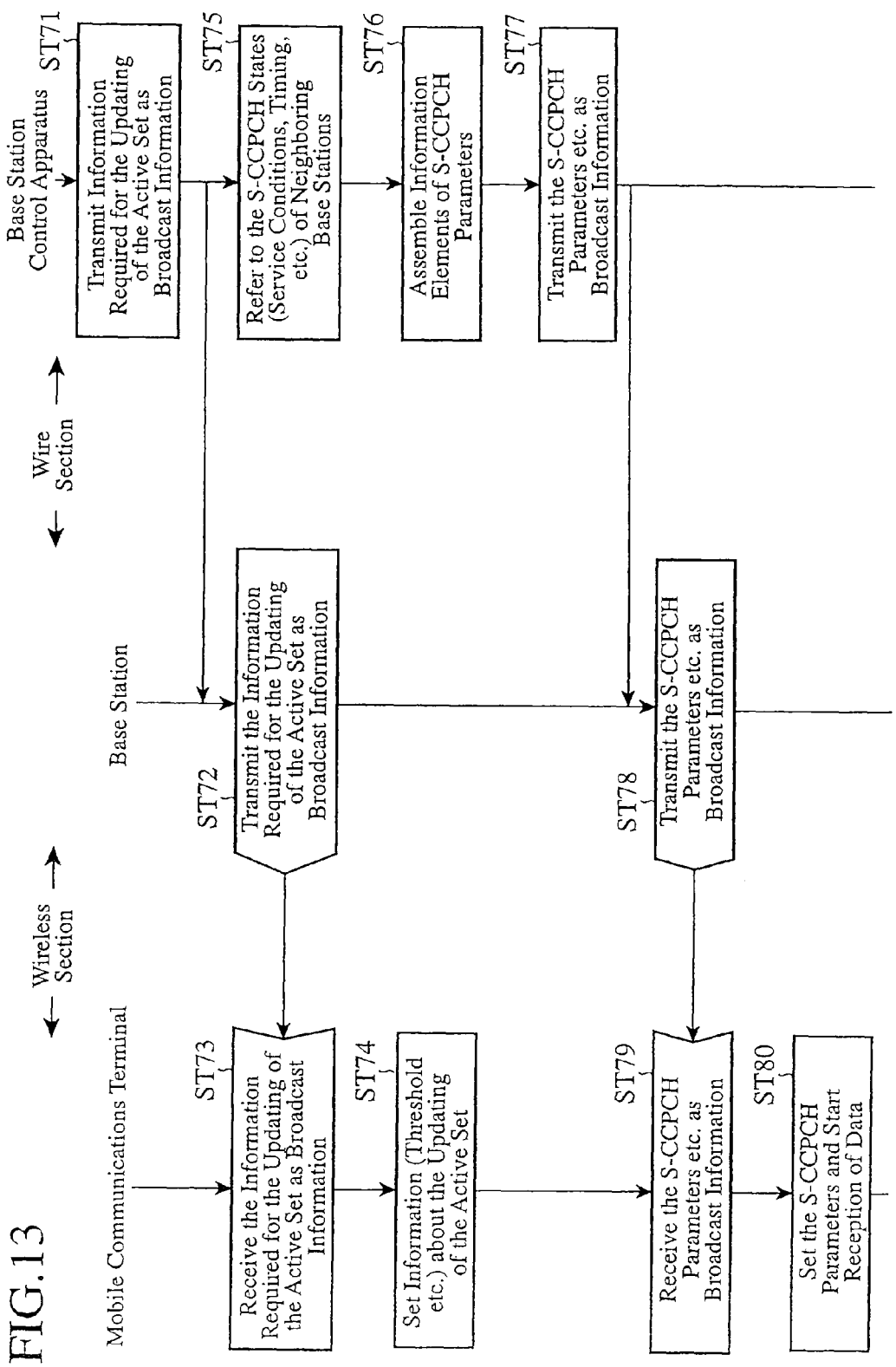
FIG. 13 is a sequence diagram showing parameter information at the time of the updating of the active set in the radio communications system.

FIG. 13 is a sequence diagram showing parameter information when the radio communications system of this embodiment updates the active set.

First, a base station control apparatus 4 transmits, as broadcast information, information (e.g., a threshold) required for the updating of the active set to corresponding base stations 5 (in step ST71).

When receiving the broadcast information from a base station control apparatus 4, the base station 5 transmits the broadcast information to mobile communications terminals 6 (in step ST72).

When receiving the broadcast information from the base station 5 (in step ST73), the mobile communications terminal refers to the broadcast information and then sets the information (e.g., the threshold) required for the updating of the active set (in step ST73).

The base station control apparatus 4 refers to the states of the S-CCPCHs (e.g., service conditions and timing) of neighboring base stations after transmitting the broadcast information to base stations 5 (in step ST75).

The base station control apparatus 4 then assembles, as information elements, S-CCPCH parameters (in step ST76), and transmits, as broadcast information, the S-CCPCH information elements to base stations 5 (in step ST77).

When receiving the broadcast information from the base station control apparatus 4, the base station 5 transmits the broadcast information to mobile communications terminals 6 (in step ST78).

When receiving the broadcast information from the base station 5 (in step ST79), each mobile communications terminal 6 refers to the broadcast information to set the S-CCPCH parameters and starts reception of data (in step ST80).

Figure 14:
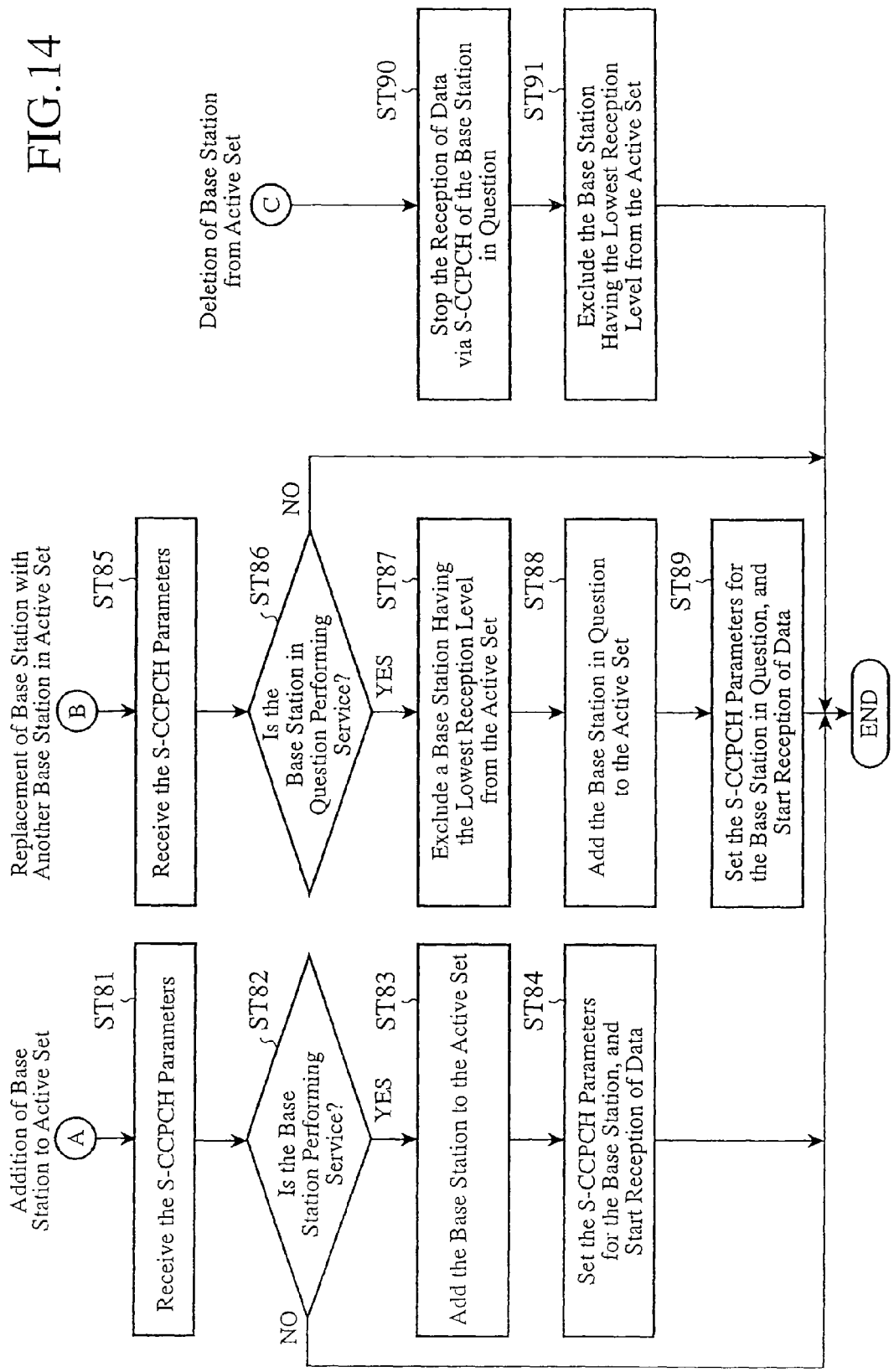
FIG. 14 is a flow chart showing a process of updating the active set in a mobile communications terminal.

FIG. 14 is a flow chart showing a process of updating the active set carried out by each mobile communications terminal 6. However, since a process of adding a base station into the active set, a process of replacing a base station of the active set with another base station, and a process of deleting a base station from the active set of each mobile communications terminal 6 are the same as those of FIG. 11, the explanation of them will be omitted hereafter.

The Process of Adding a Base Station into the Active Set

The protocol processing unit 26 of each mobile communications terminal 6 receives the S-CCPCH parameters (including the state of services using the S-CCPCH) as broadcast information from a base station 5 (in step ST81).

The protocol processing unit 26 then refers to the state of services using the S-CCPCH included in the S-CCPCH parameters to check to see whether the base station 5 corresponding to the S-CCPCH parameters is currently performing a service (in step ST82).

When the base station 5 corresponding to the S-CCPCH parameters is currently performing a service, the protocol processing unit 26 adds the base station 5 to the active set (in step ST83).

The protocol processing unit 26 also notifies the S-CCPCH parameters to the search unit 15, finger assignment control unit 17, and RAKE combining unit 18.

After that, each mobile communications terminal starts a process of receiving data associated with the S-CCPCHs of the base stations 5 included in the active set including the added base station 5 (in step ST84).

The Process of Replacing a Base Station of the Active Set with Another Base Station The protocol processing unit 26 receives, as broadcast information, the S-CCPCH parameters (including the state of services using the S-CCPCH) from a base station 5 (in step ST85).

The protocol processing unit 26 then refers to the state of services using the S-CCPCH included in the S-CCPCH parameters to check to see whether the base station 5 corresponding to the S-CCPCH parameters is currently performing a service (in step ST86).

When the base station 5 corresponding to the S-CCPCH parameters is currently performing a service, the protocol processing unit 26 excludes a base station 5 having the lowest reception level from the base stations 5 included in the current active set (in step ST87).

The protocol processing unit 26 then adds the base station 5 corresponding to the S-CCPCH parameters to the active set (in step ST88).

The protocol processing unit 26 also notifies the S-CCPCH parameters to the search unit 15, finger assignment control unit 17, and RAKE combining unit 18.

After that, each mobile communications terminal starts a process of receiving data associated with the S-CCPCHs of the base stations 5 included in the active set including the base station 5 which is added to the active set in place of the excluded base station (in step ST89).

The Process of Deleting a Base Station from the Active Set

The protocol processing unit 26 stops the process of receiving data associated with the S-CCPCH of a base station 5 having the lowest reception level which is included in the base stations 5 of the current active set (in step ST90), and excludes the base station 5 from the active set (in step ST91).

As can be seen from the above description, in accordance with this embodiment 4, each mobile communications terminal 6 is so constructed as to, when updating the active set, receive required broadcast information from a base station 5 and refer to the broadcast information to update the active set. Therefore, the present embodiment offers an advantage of being able to secure the reception quality of radio signals even if each mobile communications terminal 6 moves.

In accordance with this embodiment 4, each mobile communications terminal 6 does not need to transmit a request to update the active set to a base station 5, unlike that of above-mentioned embodiment 3. Therefore, the present embodiment offers another advantage of making it possible for each mobile communications terminal to carry out the process of updating the active set more promptly than that of above-mentioned embodiment 3.

While the radio communications system of this embodiment can broadcast information about S-CCPCHs to a plurality of mobile communications terminals 6 at a time, each mobile communications terminal does not need to notify information including information about the process of adding a base station to the active set to base stations 5. Therefore, the present embodiment offers a further advantage of being able to reduce the number of times that signaling is performed when a large number of mobile communications terminals 6 are staying in the coverage area of each base station.

Embodiment 5

In accordance with above-mentioned embodiment 3, each mobile communications terminal 6 compares the reception levels of radio signals transmitted from a plurality of base stations 5, and transmits a request to update the active set to a base station 5 according to the result of the comparison, as previously explained. When comparing the reception levels of radio signals transmitted from a plurality of base stations 5, each mobile communications terminal 6 can estimate the reception levels of the radio signals as follows.

In other words, in order to check reception power as the reception level of a radio signal transmitted using an S-CCPCH, each mobile communications terminal needs to set a code and timing for the S-CCPCH and demodulate the signal to determine power RSCP assigned to the code.

However, in order to acquire the S-CCPCH parameters in advance and to carry out set the code for the S-CCPCH, each mobile communications terminal needs to carry out complicated processing.

In accordance with this embodiment 5, a base station 5 notifies a ratio between the power of a CPICH (i.e., a pilot channel) and that of an S-CCPCH (i.e., a common channel) to a mobile communications terminal 6 in advance, and the mobile communications terminal 6 measures the power of the CPICH and practices the method of estimating the power of the S-CCPCH from the measured power of the CPICH and the above-mentioned ratio between the power of the CPICH and that of the S-CCPCH.

To be more specific, the processing is carried out as follows.

Figure 15:
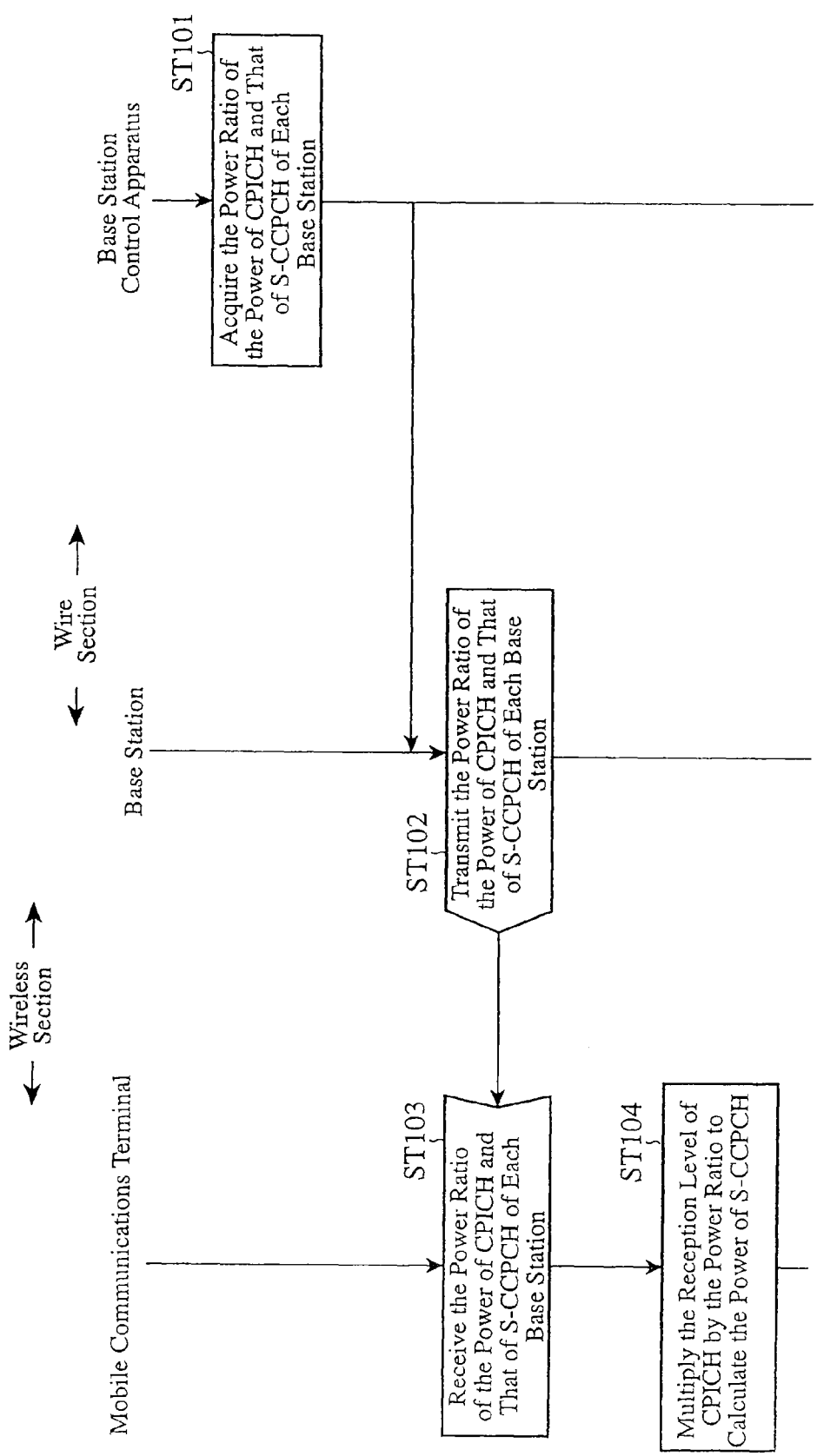
FIG. 15 is a sequence diagram showing notification of the ratio between the power of a CPICH and that of an S-CCPCH.

FIG. 15 is a sequence diagram showing the notification of the ratio between the power of the CPICH and that of the S-CCPCH.

First, a base station control apparatus 4 acquires the ratio between the power of the CPICH of each base station 5 and that of the S-CCPCH (in step ST101).

The base station control apparatus 4 then transmits, as broadcast information, the ratio between the power of the CPICH and that of the S-CCPCH to each base station 5.

When receiving the broadcast information from the base station control apparatus 4, each base station 5 transmits the broadcast information to mobile communications terminals 6 (in step ST102).

Each mobile communications terminal 6 measures the power of the CPICH of each base station 5, and, when receiving the broadcast information from a base station 5 (in step ST103), refers to the broadcast information, and calculates the power of the S-CCPCH by multiplying the power of the CPICH of each base station 5 by the ratio between the power of the CPICH and that of the S-CCPCH (in step ST104).

Figure 16:
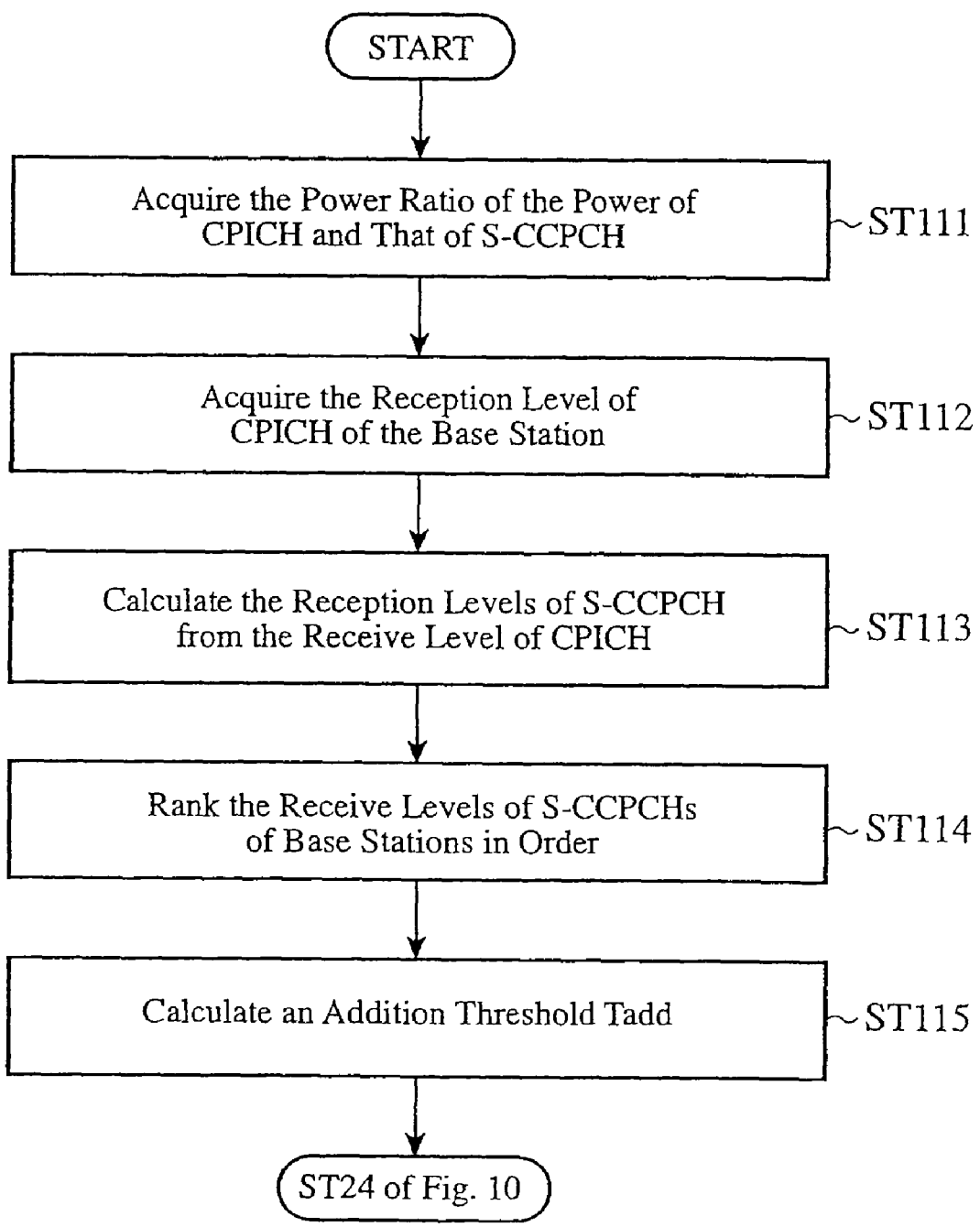
FIG. 16 is a flow chart showing a process of updating the active set in a mobile communications terminal.

FIG. 16 is a flow chart showing the process of updating the active set of each mobile communications terminal.

The search unit 15 of each mobile communications terminal 6 receives, as broadcast information, the ratio between the power of the CPICH of each base station 5 and that of the S-CCPCH from a base station 5 (in step ST111).

The search unit 15 measures, as the power of the CPICH of each base station 5, the reception level of the CPICH of each base station 5 which is not included in the current active set, as well as the reception level of the CPICH of each base station 5 included in the current active set (in step ST112).

The search unit 15 then calculates the power of the S-CCPCH of each base station 5 by multiplying the power of the CPICH of each base station 5 by the ratio between the power of the CPICH and that of the S-CCPCH (in step ST113).

The search unit 15 compares the reception levels of the S-CCPCH of the base stations 5 with one another, and ranks them in order (in step ST114).

The search unit 15 sets the lowest one of the reception levels of the S-CCPCHs of the base stations 5 included in the active set to X, and calculates an addition threshold Tadd from the lowest S-CCPCH reception level X and a hysteresis parameter H for preventing variations in the active set.

$$Tadd = X + H/2$$

In this case, the search unit 15 can receive the addition threshold Tadd from an upper layer instead of calculating the addition threshold Tadd.

When calculating the addition threshold Tadd in the above-mentioned way, the search unit 15 shifts to the process of step ST24 of FIG. 10. Since subsequent processes are the same as those of above-mentioned embodiment 1, the explanation of the processes will be omitted hereafter.

As can be seen from the above description, in accordance with this embodiment 5, each mobile communications terminal is so constructed as to receive information indicating the ratio between the power of the CPICH and that of the S-CCPCH from each of a plurality of base stations 6 in advance, and estimates the reception levels of radio signals transmitted from the plurality of base stations 5 using the S-CCPCHs from the reception levels of radio signals transmitted from the plurality of base stations 5 using the CPICHs and the ratio between the power of the CPICH of each base station and that of the S-CCPCHs. Therefore, the present embodiment offers an advantage of being able to acquire the reception levels of radio signals transmitted from the plurality of base stations 5 using the S-CCPCHs without carrying out complicated processing, such as a process of acquiring the S-CCPCH parameters to carry out code setting. The present embodiment is useful especially for a case where the transmission levels of the S-CCPCHs vary among the plurality of base stations 5 since a number of code setting processes can be eliminated.

INDUSTRIAL APPLICABILITY

As mentioned above, the radio communications system in accordance with the present invention is suitable for a case where when a plurality of base stations broadcast multimedia data to mobile communications terminals using S-CCPCHs, each mobile communications terminal needs to select a base station from which it can receive the multimedia data optimally to improve the reception quality of the multimedia data.

The invention claimed is:

1. A communications method relating to a multimedia broadcast multicast service (MBMS) of multicasting or broadcasting a multimedia data to a plurality of mobile stations in a communications system, said communications method comprising:

a power ratio transmitting step of transmitting information about a power ratio between a power of a common control physical channel used for multicasting or broadcasting said multimedia data in each of given cells and a power of a common pilot channel used for transmitting an information on reference of timing in each of the given cells;

a service information transmitting step of transmitting service information indicating a state of an MBMS service in each of the given cells;

a power ratio information receiving step of receiving the information about the power ratio transmitted in said power ratio transmitting step;

a service information receiving step of receiving the service information transmitted in said service information transmitting step;

a cell selecting step of acquiring a set including a plurality of cells from which a mobile station can receive an MBMS on the basis of the information about said power ratio which is received in said power ratio receiving step, and said service information received in said service information receiving step;

a decoding step of receiving a signal transmitted using said common control physical channel in each of the plurality of cells included in the set acquired in said cell selecting step, and decoding said signal to acquire a plurality of decoded signals; and a selectively-combining step of selecting a signal from the plurality of decoded signals acquired in said decoding step and thereby obtaining an output signal.

* * * * *